US012365188B2

(12) United States Patent
Oba

(10) Patent No.: US 12,365,188 B2
(45) Date of Patent: Jul. 22, 2025

(54) PRINT DEVICE, PRINT METHOD, AND NON-TRANSITORY COMPUTER-READABLE MEDIUM STORING PRINT PROGRAM

(71) Applicant: BROTHER KOGYO KABUSHIKI KAISHA, Nagoya (JP)

(72) Inventor: Ayaka Oba, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/703,615

(22) Filed: Mar. 24, 2022

(65) Prior Publication Data

US 2022/0314639 A1 Oct. 6, 2022

(30) Foreign Application Priority Data

Mar. 30, 2021 (JP) ................................ 2021-056655

(51) Int. Cl.
*B41J 3/407* (2006.01)
*B41F 33/00* (2006.01)
(Continued)

(52) U.S. Cl.
CPC ......... *B41J 3/4075* (2013.01); *B41F 33/0036* (2013.01); *B41J 3/50* (2013.01);
(Continued)

(58) Field of Classification Search
None
See application file for complete search history.

(56) References Cited

U.S. PATENT DOCUMENTS 5,700,096 A 12/1997 Satoh et al.
7,874,593 B1 * 1/2011 Clem ............... G07B 17/00508 428/58

(Continued)

FOREIGN PATENT DOCUMENTS

JP S64-27970 A 1/1989
JP H06-297739 A 10/1994

(Continued)

OTHER PUBLICATIONS

Japanese Office Action for the related Japanese Patent Application No. 2021-056655 dated Nov. 26, 2024.

*Primary Examiner* — Alejandro Valencia
(74) *Attorney, Agent, or Firm* — KENEALY VAIDYA LLP

(57) ABSTRACT

A print device prints prescribed information on a plurality of print media including at least one first medium and at least one second medium arranged subsequent to the at least one first medium on a long medium. The plurality of print media corresponds to a zone number that is smaller than a total number of the print media to be printed. The print device judges, for each of the at least one first medium, a print quality or a degree of the print quality. The judging the print quality or the degree of the print quality is based on a prescribed result obtained the print content of the at least one first medium on which the printing has been performed. The print device prints, on the at least one second medium, judgment result information indicating a result of the judging the print quality or the degree of the print quality.

19 Claims, 14 Drawing Sheets

(51) Int. Cl.

| | |
|---|---|
| ***B41J 3/50*** | (2006.01) |
| ***B41J 11/00*** | (2006.01) |
| ***B41J 11/66*** | (2006.01) |
| ***B41J 11/70*** | (2006.01) |

(52) U.S. Cl.
CPC ............ *B41J 11/007* (2013.01); *B41J 11/663* (2013.01); *B41J 11/70* (2013.01)

(56) References Cited

U.S. PATENT DOCUMENTS

| | | | | |
|---|---|---|---|---|
| 7,933,845 | B1 * | 4/2011 | Leon ................ | G07B 17/00024 705/401 |
| 2008/0187384 | A1 | 8/2008 | Yamamoto | |
| 2018/0335742 | A1 | 11/2018 | Narimatu | |
| 2019/0213361 | A1 * | 7/2019 | Ackley .................... | G06K 5/02 |

FOREIGN PATENT DOCUMENTS

| | | | |
|---|---|---|---|
| JP | 2008191215 | A | 8/2008 |
| JP | 2013-151129 | A | 8/2013 |
| JP | 2017-007111 | A | 1/2017 |
| JP | 2018-030254 | A | 3/2018 |
| JP | 2018192752 | A | 12/2018 |

* cited by examiner

FIG. 5

80

| DATABASE | | |
|---|---|---|
| No. | CODE INFORMATION | OTHER PRINT ITEMS |
| A001 | AaBA.gif | A001 |
| A002 | cAbB.gif | A002 |
| A003 | ZdHk.gif | A003 |
| A004 | bCbf.gif | A004 |
| A005 | EYbu.gif | A005 |
| A006 | CPgm.gif | A006 |
| ⋮ | ⋮ | ⋮ |
| A096 | qVrw.gif | A096 |
| A097 | bjai.gif | A097 |
| A098 | NDna.gif | A098 |
| A099 | cKunq.gif | A099 |
| A100 | Kmfy.gif | A100 |
| A101 | Wsje.gif | A101 |
| ⋮ | ⋮ | ⋮ |

PRINT DEVICE, PRINT METHOD, AND NON-TRANSITORY COMPUTER-READABLE MEDIUM STORING PRINT PROGRAM

CROSS-REFERENCE TO RELATED APPLICATIONS

This application claims priority to Japanese Patent Application No. 2021-056655, filed on Mar. 30, 2021, the content of which is hereby incorporated by reference.

BACKGROUND

The present disclosure relates to a print device, a print method, and a non-transitory computer-readable medium storing a print program.

In known art, a print device is known that performs printing on a label of a long medium on which a plurality of the labels are disposed in order. The known print device is provided with a scanner that reads information printed on the printed label, and performs a quality judgment of the printed information. After printing all of a predetermined number of the labels, the print device prints an error log, which is based on the quality judgment of the printed information, on the label subsequent to the label that is printed last. The error log includes information, such as a number of the labels for which the quality judgment of the printed information has been judged to be not good, the number, in order, of the printed label on which the printed information has been judged to be not good, and the like.

SUMMARY

In the above-described printer, the label on which the error log is printed is issued after the predetermined number of labels have all been printed. When identifying the label for which it has been judged that the printed information is not good, it is necessary for an operator to perform an operation to search for the label for which the printed information has been judged to be not good, while counting all the printed labels in order from the beginning, and at the same time referring to the error log. The greater the number of labels, the more complex this operation is for the operator.

An object of the present disclosure is to provide a print device, a print method, and a non-transitory computer-readable medium storing a print program with which a print medium to be identified can be easily identified, even when there is a large number of the print media to be printed.

A print device according to the present disclosure includes a conveyance portion, a print portion, a reading portion, a processor, and a memory. The conveyance portion is configured to convey a long medium, on which a plurality of print media is arranged in order, in a forward direction and a reverse direction opposite to the forward direction, in a conveyance direction of the long medium. The print portion is configured to perform printing on each of the plurality of print media conveyed in the forward direction by the conveyance portion. The reading portion is configured to read print content printed on each of the plurality of print media. The reading portion is disposed downstream of the print portion in the forward direction, in the conveyance direction. The processor is configured to control the conveyance portion, the print portion, and the reading portion. The memory stores computer-readable instructions. When executed by the processor, the computer-readable instructions instruct the processor to perform printing prescribed information on the plurality of print media. The number of the plurality of print media corresponds to a zone number. The zone number is a number smaller than a total print number that is a total number of the plurality of print media to be printed by the print portion. The plurality of print media includes at least one first medium and at least one second medium arranged subsequent to the at least one first medium on the long medium. The prescribed information is specific information including code information. Then, the computer-readable instructions instruct the processor to perform judging, for each of the at least one first medium, a print quality or a degree of the print quality. The judging the print quality or the degree of the print quality is based on a prescribed result. The prescribed result is a result obtained by reading, using the reading portion, the print content of the at least one first medium on which the printing has been performed. The computer-readable instructions instruct the processor to perform printing judgment result information on the at least one second medium. The judgment result information is information indicating a result of the judging the print quality or the degree of the print quality.

When the code information is printed on the print medium, it is necessary for the print content to be good. Thus, it is necessary for a user of the print device to perform an operation to identify, from the print medium on which the printing has been performed, the print medium for which the print content is not good, and to remove the identified print medium, and the like. For each of the first media corresponding to the zone number, the print device according to the present disclosure prints the judgment result information indicating a judgment result for a reading result of each of the first media, on the second medium arranged next to the first media on the long medium. The user can identify the print medium that is to be identified, from among the first media corresponding to the zone number, on the basis of the judgment result information printed on the second medium. Thus, with the print device, the print medium to be identified can be easily identified even when the total print number is large.

A print method according to the present disclosure includes printing prescribed information on the plurality of print media using a print portion. The print portion is configured to perform the printing. The number of the plurality of print media corresponds to a zone number. The zone number is a number smaller than a total print number that is a total number of the plurality of print media to be printed. The plurality of print media includes at least one first medium and at least one second medium arranged subsequent to the at least one first medium on the long medium. The prescribed information is specific information including code information. The print method also includes judging, for each of the at least one first medium, a print quality or a degree of the print quality. The judging the print quality or the degree of the print quality is based on a prescribed result. The prescribed result is a result obtained by reading, using a reading portion, a print content of the at least one first medium on which the printing of the prescribed information has been performed. The reading portion is configured to read the print content printed on the plurality of print media. The print method also includes printing judgment result information on the at least one second medium. The judgment result information is information indicating a result of the judging the print quality or the degree of the print quality.

A non-transitory computer-readable medium according to the present disclosure stores a print program including computer-readable instructions for performing printing on a long medium on which a plurality of print media is arranged in order. When executed by a processor of a device, the computer-readable instructions instruct a processor in a print device to perform printing prescribed information on the plurality of print media using a print portion configured to perform the printing. The number of the plurality of print media corresponds to a zone number. The zone number is a number smaller than a total print number that is a total number of the plurality of print media to be printed. The plurality of print media includes at least one first medium and at least one second medium arranged subsequent to the at least one first medium on the long medium. The prescribed information is specific information including code information. Then, the computer-readable instructions also instruct the processor to perform judging, for each of the at least one first medium, a print quality or a degree of the print quality. The judging the print quality or the degree of the print quality is based on a prescribed result. The prescribed result is a result obtained by reading, using a reading portion, a print content of the at least one first medium on which the printing of the prescribed information has been performed. The reading portion is configured to read the print content printed on the plurality of print media. And then, the computer-readable instructions also instruct the processor to perform printing judgment result information on the at least one second medium. The judgment result information is information indicating a result of the judging the print quality or the degree of the print quality.

As a result of executing the above-described print method and print program stored in the non-transitory computer-readable medium, the same effects can be obtained as with the above-described print device.

BRIEF DESCRIPTION OF THE DRAWINGS

Embodiments of the disclosure will be described below in detail with reference to the accompanying drawings in which:

FIG. 5 is an explanatory diagram of a database;

DETAILED DESCRIPTION

Figure 1:
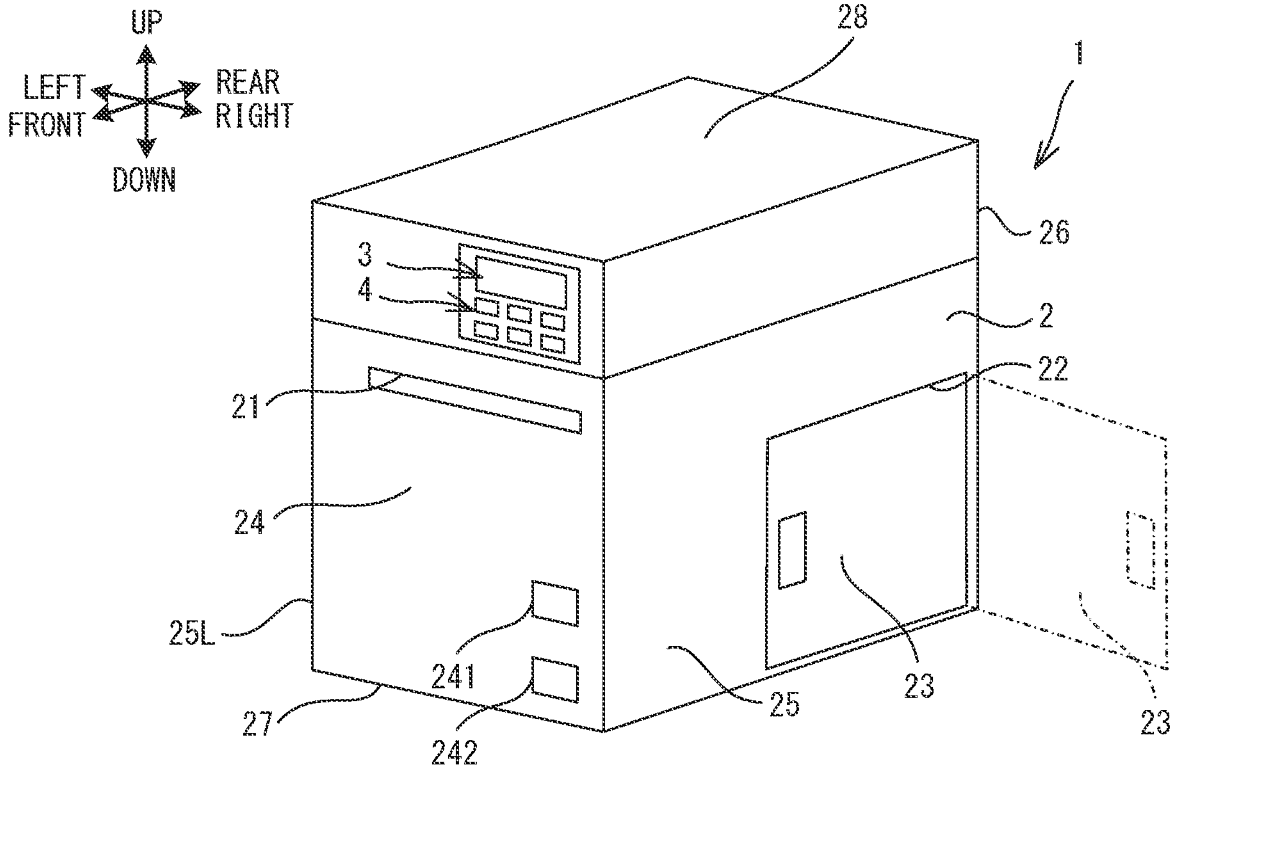
FIG. 1 is a perspective view of a print device.

A print device 1 according to the present disclosure will be described with reference to the drawings. The drawings that are referenced are used to illustrate the technical characteristics that can be employed by the present disclosure. The configurations and the like of the devices that are described are not intended to be limited thereto, but are merely illustrative examples. In the following description, left and right, front and rear, and up and down indicated by arrows in the drawings are used.

A configuration of the print device 1 will be described with reference to FIG. 1, and FIG. 2 and FIG. 3. As shown in FIG. 1, the print device 1 is provided with a housing 2, a display portion 3, an operation portion 4, a winding device connection portion 241, and an external device connection portion 242.

The housing 2 includes a front wall 24, a right wall 25, a rear wall 26, a left wall 25L, a lower wall 27, an upper wall 28, and a cover 23. The housing 2 is a cuboid shape of a size that can be placed on a table. A discharge port 21 and an opening 22 are formed in the housing 2. The discharge port 21 is formed in a rectangular shape that is long in the left-right direction in a front view, in the front wall 24 of the housing 2. The opening 22 is formed in a rectangular shape in a right side view, in a rear lower portion of the right wall 25 of the housing 2. The cover 23 is a plate that is rectangular in a right side view. The cover 23 is supported at a rear lower portion of the right side surface of the housing 2 such that the cover 23 can rotate between a closed position (illustrated using a solid line in FIG. 1) in which the opening 22 is closed, and an open position (illustrated using an alternate long and short dash line in FIG. 1) in which the opening 22 is open. The display portion 3 is provided at an upper right portion in the front surface of the front wall 24 of the housing 2, and displays an image. The operation portion 4 is provided below the display portion 3, of the upper right portion of the front surface of the front wall 24 of the housing 2, and is configured by a plurality of buttons used to input various commands. The display portion 3 and the operation portion 4 are provided above the discharge port 21.

Figure 2:
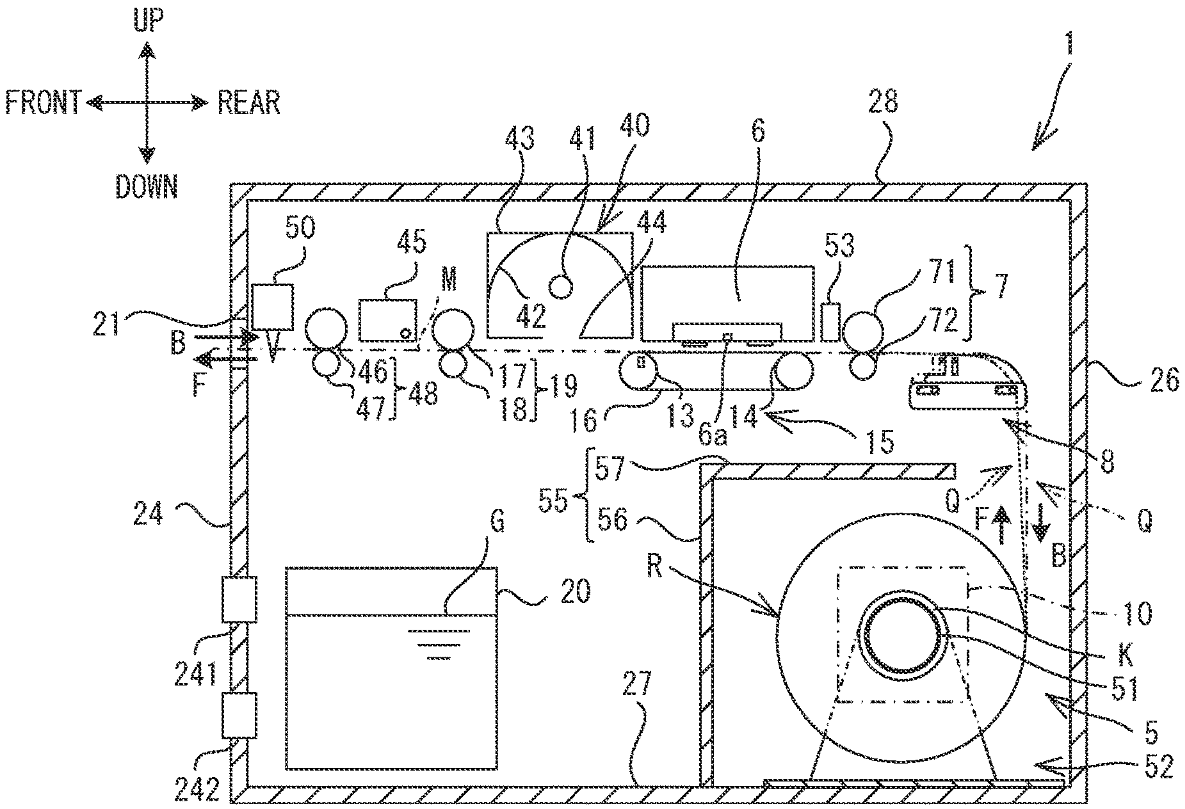
FIG. 2 is a cross-sectional view illustrating an internal configuration of the print device in a state in which a winding device is not connected.
Figure 3:
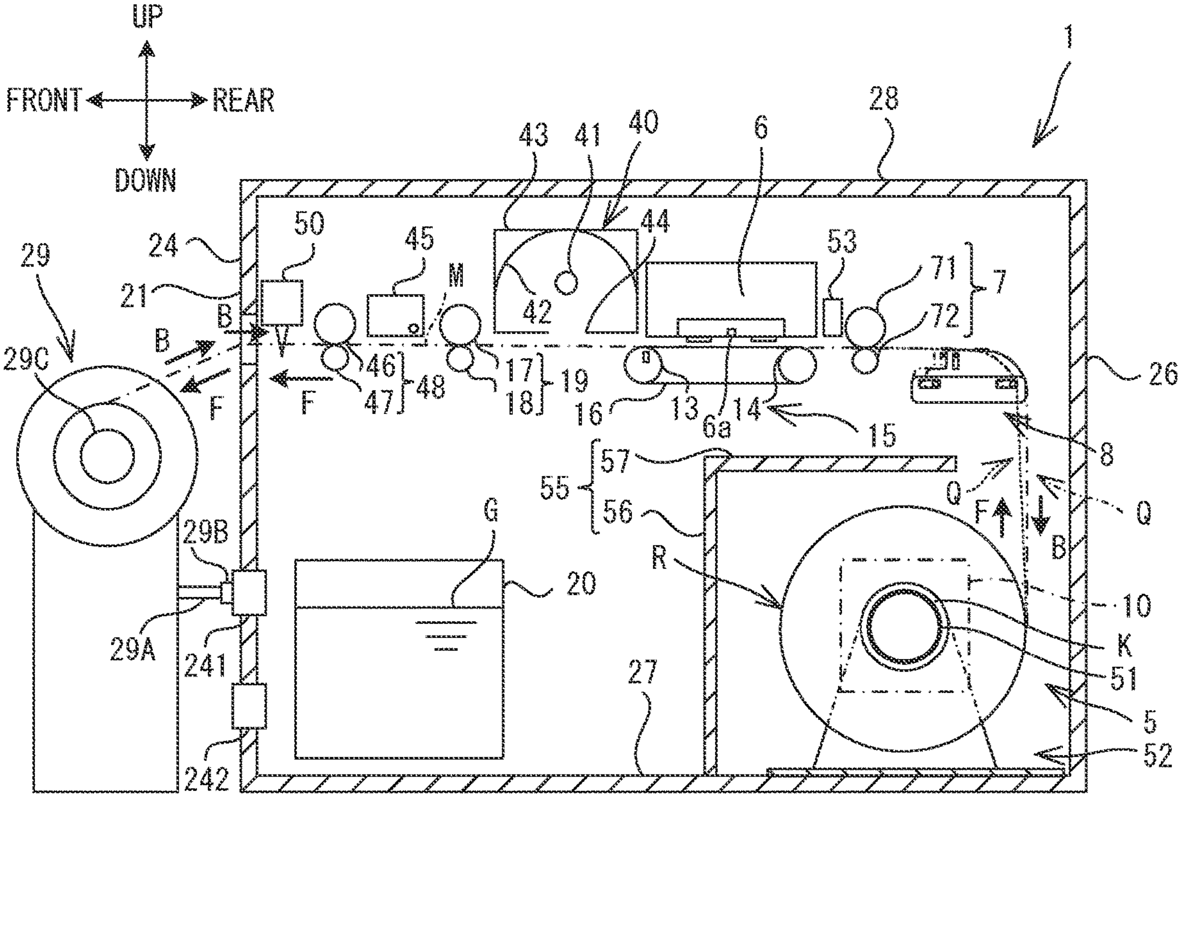
FIG. 3 is a cross-sectional view illustrating the internal configuration of the print device in a state in which the winding device is connected.

As illustrated in FIG. 2 and FIG. 3, the print device 1 houses, inside the housing 2, a second conveyance portion 10, a holding portion 5, a partition wall 55, a back tension applying portion 8, a first conveyance portion 7, a medium detection portion 53, a print portion 6, a third conveyance portion 15, a fixing unit 40, a fourth conveyance portion 19, a reading portion 45, a fifth conveyance portion 48, and a cutting portion 50. The print device 1 is an inkjet printer that performs printing on a long medium M. The long medium M is a long base wound in a roll shape on a tubular paper tube K, for example. A plurality of print media L is respectively aligned along the lengthwise direction of the long medium M. The long medium M may be a linerless tape that is not provided with the base. In the embodiment, the plurality of print media L is labels.

The partition wall 55 includes a first wall portion 56 extending upward from the lower wall 27 of the housing 2, and a second wall portion 57 extending to the rear from the upper end of the first wall portion 56, and partitions the internal space of the housing 2. The second wall portion 57 is separated from the rear wall 26 of the housing 2 in the front-rear direction. The holding portion 5 is provided to the left of the cover 23 in the closed position, in a space in the lower rear portion of the print device 1 that is surrounded by the partition wall 55 and the housing 2, and holds the long medium M. The holding portion 5 holds a roll R on which the long medium M is wound. The long medium M is wound on the roll R such that the plurality of print media L is on the outer side thereof. The holding portion 5 of the embodiment is provided with a shaft portion 51 and a magazine 52. The shaft portion 51 extends in the left-right direction, and is inserted through the paper tube K of the roll R. The magazine 52 is a support base having a U-shape in a front view, and supports both left and right ends of the shaft portion 51 such that the shaft portion 51 can rotate around an axis extending in the left-right direction. The shaft portion 51 is detachably supported by the magazine 52. The magazine 52 is detachably supported by the print device 1. When a user replaces the roll R, the user disposes the cover 23 in the open position, detaches the magazine 52 from inside the housing 2, and performs the replacement operation of the roll R. The roll R need not necessarily include the paper tube K, and may be wound in a roll shape that can be mounted on the holding portion 5.

The second conveyance portion 10 is provided upstream of the first conveyance portion 7, in a forward direction F. The second conveyance portion 10 conveys the long medium M in the forward direction F and a reverse direction B. The second conveyance portion 10 of the embodiment is detachably engaged with the shaft portion 51 of the holding portion 5, and transmits a drive power of a second conveyance drive portion 11 to be described later with reference to FIG. 4 to the shaft portion 51, thus causing the shaft portion 51 to rotate. When rotating in normal direction, the second conveyance portion 10 rotates the roll R held by the holding portion 5, conveys the long medium M in the forward direction F, and feeds out the roll R to the print portion 6. When rotating in a reverse direction, the second conveyance portion 10 rotates the roll R held by the holding portion 5, conveys the long medium M in the reverse direction B, and winds up the roll R.

The print portion 6 prints an image on each of the plurality of print media L of the long medium M that is fed out from the holding portion 5 and conveyed. The print portion 6 of the embodiment is provided with a plurality of nozzles 6*a* that discharge a liquid G in a discharge direction, and is an inkjet head that performs the printing of the image on each of the plurality of print media L by discharging the liquid G from the plurality of nozzles 6*a*. The discharge direction of the embodiment is the downward direction, and the print portion 6 is provided in a posture in which the plurality of nozzles 6*a* are oriented downward, above a conveyance path Q of the long medium M. The position of the print portion 6 is fixed, and the images are formed on the print media L by the liquid G being discharged from the nozzles 6*a* of the print portion 6 with respect to the print media L that is conveyed in the forward direction F along the conveyance path Q. The conveyance path Q is a path along which the long medium M fed out from the holding portion 5 is conveyed until the long medium M is discharged to the outside of the housing 2 from the discharge port 21. The liquid G is supplied to the print portion 6, via a tube, from a tank 20 disposed inside the housing 2. Hereinafter, the direction along the conveyance path Q is referred to as a conveyance direction.

The first conveyance portion 7 conveys the long medium M in the conveyance direction, in the forward direction F from the holding portion 5 to the print portion 6, and in the reverse direction B that is the opposite direction to the forward direction F. The forward direction F is a direction along the conveyance path Q from the holding portion 5 toward the print portion 6. The conveyance direction is a direction intersecting the left-right direction that is an extending direction of the rotation axis of the roll R, and is a direction that changes in accordance with the position on the conveyance path Q. The conveyance direction from the holding portion 5 to the back tension applying portion 8 is a direction that changes in accordance with a remaining amount of the long medium M, and when the remaining amount of the long medium M is an initial value (the remaining amount after the replacement of the roll R), as illustrated in FIG. 2 and FIG. 3, the conveyance direction is substantially upward. The conveyance direction from the back tension applying portion 8 to the discharge port 21 is substantially to the front. In other words, in the print device 1, at a section at which the long medium M comes into contact with the back tension applying portion 8, the conveyance path Q bends, and the conveyance direction changes from upward toward the front. The print portion 6 prints the images on each of the plurality of print media L of the long medium M fed out from the holding portion 5 and conveyed in the forward direction F.

The first conveyance portion 7 is provided upstream of the print portion 6 in the forward direction F, and downstream of the holding portion 5 in the forward direction F. The first conveyance portion 7 of the embodiment includes a conveyance roller 71 and a pinch roller 72 that rotate around axes extending in the left-right direction, and nips and conveys the long medium M by sandwiching the long medium M from above and below between the conveyance roller 71 and the pinch roller 72.

The medium detection portion 53 is a known optical sensor that can detect the long medium M. The medium detection portion 53 is provided with a light emitting portion and a light receiving portion, and detects whether or not light emitted from the light emitting portion is received by the light receiving portion. The medium detection portion 53 is provided, above the conveyance path Q, between the first conveyance portion 7 and the print portion 6. The medium detection portion 53 detects the presence or absence of a leading end of the long medium M conveyed in the forward direction F.

The back tension applying portion 8 applies a back tension to the long medium M on the conveyance path Q, between the holding portion 5 and the first conveyance portion 7. The back tension is a tension that acts in the reverse direction to a progress direction of the long medium M. The back tension applying portion 8 is disposed upstream of the first conveyance portion 7 in the forward direction F, and downstream of the second conveyance portion 10 in the forward direction F. The back tension applying portion 8 is in contact with the long medium M and urges the long medium M in a direction intersecting the forward direction F. The back tension applying portion 8 is provided to the rear of the first conveyance portion 7 and above the holding portion 5.

The fixing unit 40 is disposed downstream of the print portion 6 in the forward direction F. The fixing unit 40 is a halogen heater and includes a halogen lamp 41, a reflective plate 42, and a housing 43. An opening 44 in the left-right direction is formed in a lower wall of the housing 43. The fixing unit 40 radiates infrared rays through the opening 44, and heats the long medium M passing directly below the opening 44. In this way, the liquid G discharged by the print portion 6 onto the plurality of print media L on the long medium M is fixed to the plurality of print media L.

The third conveyance portion 15 is provided below the print portion 6, and downstream of the first conveyance portion 7 in the forward direction F, and conveys the long medium M in the forward direction F. The third conveyance portion 15 is provided with a drive roller 13, a driven roller 14, and an endless belt 16. The drive roller 13 and the driven roller 14 are separated from each other in the front-rear direction. The endless belt 16 is stretched between the drive roller 13 and the driven roller 14. The drive roller 13 rotates and thus rotates the endless belt 16. The driven roller 14 rotates in accordance with the rotation of the endless belt 16. The upper end on an outer peripheral surface of the endless belt 16 is in substantially the same position, in the up-down direction, as the section of the long medium M that is nipped by the first conveyance portion 7, and faces the plurality of nozzles 6*a* of the print portion 6. In the conveyance direction, the upper end on the outer peripheral surface of the endless belt 16 supports and conveys, from below, the long medium M conveyed between the first conveyance portion 7 and the fourth conveyance portion 19.

The fourth conveyance portion 19 is provided downstream of the print portion 6 and the fixing unit 40 in the forward direction F, and upstream of the discharge port 21 in the forward direction F. The fourth conveyance portion 19 conveys the long medium M in the forward direction F and the reverse direction B. The fourth conveyance portion 19 includes a conveyance roller 17 and a pinch roller 18 that rotate around axes extending in the left-right direction, and nips and conveys the long medium M by sandwiching the long medium M from above and below between the conveyance roller 17 and the pinch roller 18.

The reading portion 45 is provided, on the conveyance path Q, downstream of the print portion 6 and the fixing unit 40 in the forward direction F, and upstream of the discharge port 21 in the forward direction F. The reading portion 45 reads the image printed on each of the plurality of print media L by the print portion 6. The reading portion 45 outputs read image data to a control portion 30.

The fifth conveyance portion 48 is provided downstream of the reading portion 45 in the forward direction F, and upstream of the discharge port 21 in the forward direction F. The fifth conveyance portion 48 conveys the long medium M in the forward direction F and the reverse direction B. The fifth conveyance portion 48 includes a conveyance roller 46 and a pinch roller 47 that rotate around axes extending in the left-right direction. The fifth conveyance portion 48 nips and conveys the long medium M by sandwiching the long medium M from above and below between the conveyance roller 46 and the pinch roller 47.

The cutting portion 50 is provided downstream of the reading portion 45 and the fifth conveyance portion 48 in the forward direction F, and upstream of the discharge port 21 in the forward direction F. The cutting portion 50 is provided with a blade that extends downward, and a drive portion. The blade is driven by the driving power from the drive portion, and cuts one or a plurality of the print media L from the long medium M at substantially the same position as the discharge port 21. The cutting portion 50 discharges the one or plurality of print media L cut from the long medium M, via the discharge port 21. Note that the cutting portion 50 may cut the long medium M using a manual operation of the user.

The winding device connection portion 241 is provided at a lower right portion of the front wall 24 of the housing 2. The winding device connection portion 241 is a connector for electrically connecting to the winding device 29. The external device connection portion 242 is provided below the winding device connection portion 241 in the front wall 24. The external device connection portion 242 is a connector for electrically connecting to an external information device, such as a PC, or the like.

The winding device 29 is provided with a cable 29A and a shaft portion 29C. The cable 29A is provided with a plug 29B that can be connected to the winding device connection portion 241, at a leading end portion thereof. When using the winding device 29, the user disposes the winding device 29 to the front of the print device 1, and plugs the plug 29B into the winding device connection portion 241. In the state of being electrically connected to the print device 1, the winding device 29 is disposed downstream of the reading portion 45 in the forward direction F. In the state of being plugged into the winding device connection portion 241, the cable 29A transmits power supplied from the print device 1. A core around which the long medium M is wound is mounted on the shaft portion 29C. When causing the long medium M to be wound on the winding device 29, the user pulls the long medium M from the discharge port 21 and fixes the pulled out long medium M to the core. The winding device 29 receives the power transmitted from the print device 1 and rotates the shaft portion 29C along with the core. The long medium M discharged from the discharge port 21 is wound onto the core. When the winding device 29 is connected to the print device 1, the conveyance path Q of the long medium M discharged from the discharge port 21 bends, and the conveyance direction changes from being to the front to being diagonally downward.

Figure 4:
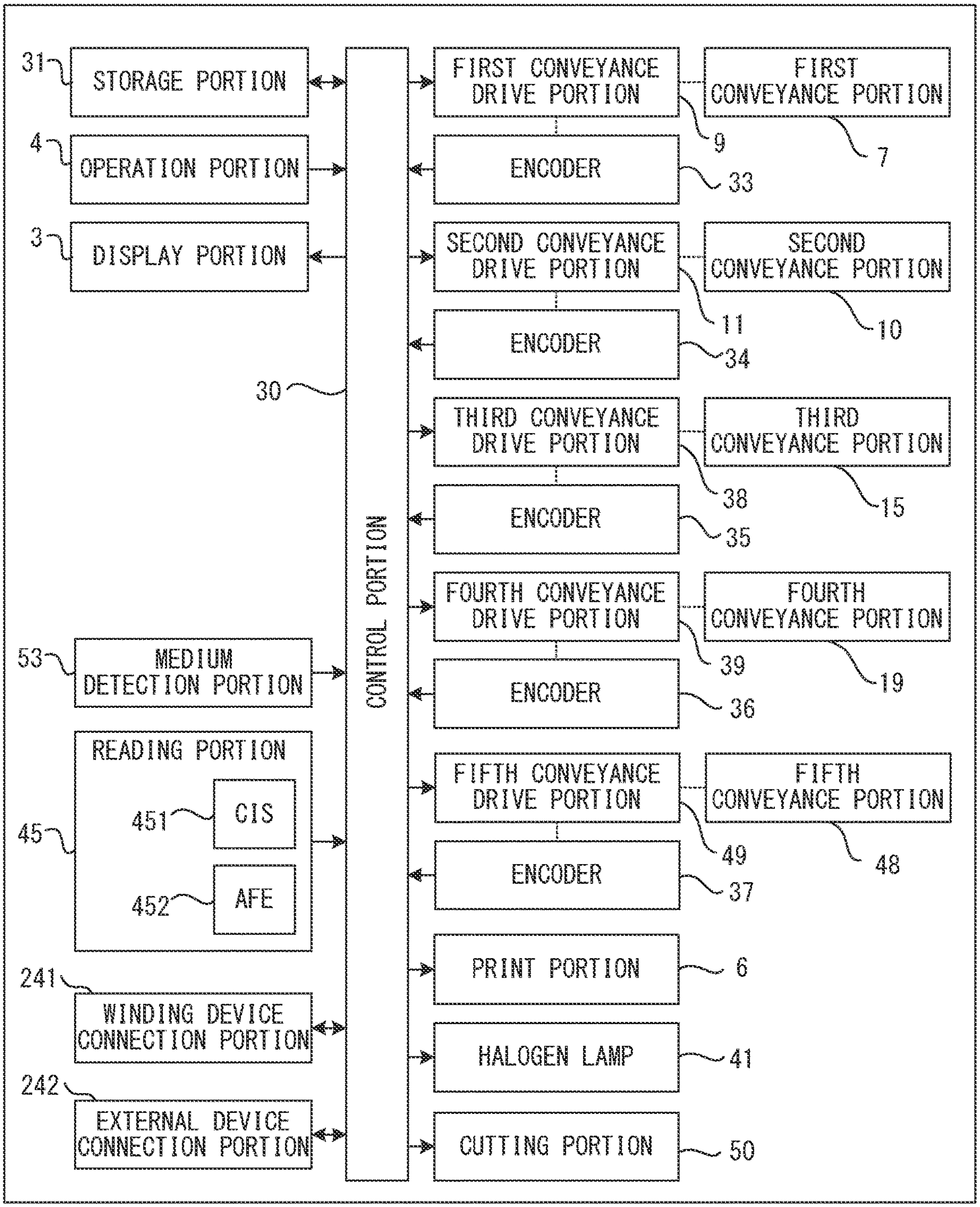
FIG. 4 is a block diagram illustrating an electrical configuration of the print device.

The electrical configuration of the print device 1 will be described with reference to FIG. 4. The print device 1 is provided with the control portion 30, and with a storage portion 31, the operation portion 4, the display portion 3, a first conveyance drive portion 9, the second conveyance drive portion 11, a third conveyance drive portion 38, a fourth conveyance drive portion 39, a fifth conveyance drive portion 49, the print portion 6, the halogen lamp 41, the cutting portion 50, encoders 33, 34, 35, 36, and 37, the medium detection portion 53, the reading portion 45, the winding device connection portion 241, and the external device connection portion 242, which are electrically connected to the control portion 30. The control portion 30 is provided with a CPU that performs overall control of the print device 1. The control portion 30 is provided with predetermined electrical circuits and the like that transmit drive signals (a drive current, for example) to the print portion 6, the halogen lamp 41, the first conveyance drive portion 9, the second conveyance drive portion 11, the third conveyance drive portion 38, the fourth conveyance drive portion 39, the fifth conveyance drive portion 49, and the cutting portion 50, in accordance with commands from the CPU. The storage portion 31 includes a ROM that stores various parameters and the like necessary when various programs are executed by the control portion 30, a RAM, a flash memory, and the like. The storage portion 31 stores a print program that causes the control portion 30 to perform print processing to be described later with reference to FIG. 6. The control portion 30 functions as an example of a processor that performs the print processing, by loading the print program stored in the storage portion 31.

The first conveyance drive portion 9 rotationally drives the first conveyance portion 7. The first conveyance drive portion 9 is a stepping motor that can rotate in the forward and reverse directions, for example. The second conveyance drive portion 11 rotationally drives the second conveyance portion 10. The second conveyance drive portion 11 is a stepping motor that can rotate in the forward and reverse directions, for example. The third conveyance drive portion 38 rotationally drives the third conveyance portion 15. The third conveyance drive portion 38 is a stepping motor, for example. The fourth conveyance drive portion 39 rotationally drives the fourth conveyance portion 19. The fourth conveyance drive portion 39 is a stepping motor that can rotate in the forward and reverse directions, for example.

The fifth conveyance drive portion 49 rotationally drives the fifth conveyance portion 48. The fifth conveyance drive portion 49 is a stepping motor that can rotate in the forward and reverse directions, for example. The encoder 33 inputs a value, to the control portion 30, in accordance with a drive amount of the first conveyance drive portion 9. The encoder 34 inputs a value, to the control portion 30, in accordance with a drives amount of the second conveyance drive portion 11. The encoder 35 inputs a value, to the control portion 30, in accordance with a drive amount of the third conveyance drive portion 38. The encoder 36 inputs a value, to the control portion 30, in accordance with a drive amount of the fourth conveyance drive portion 39. The encoder 37 inputs a value, to the control portion 30, in accordance with a drive amount of the fifth conveyance drive portion 49. Hereinafter, when the first conveyance drive portion 9, the second conveyance drive portion 11, the third conveyance drive portion 38, the fourth conveyance drive portion 39, and the fifth conveyance drive portion 49 are collectively referred to, they are referred to simply as a conveyance drive portion. The medium detection portion 53 inputs a judgment result indicating the presence or absence of the passing of the leading end of the long medium M, to the control portion 30 to be described later. The reading portion 45 is provided with a contact image sensor (CIS) 451 and an analog front end (AFE) 452. The CIS 451 reads the image printed on each of the plurality of print media L. The AFE 452 converts the analog image read by the CIS 451 to digital image data. The reading portion 45 inputs the converted image data to the control portion 30. The winding device connection portion 241 functions as an input/output interface with the winding device 29. The external device connection portion 242 functions as an input/output interface with the external information device, such as the PC or the like.

Figure 13:
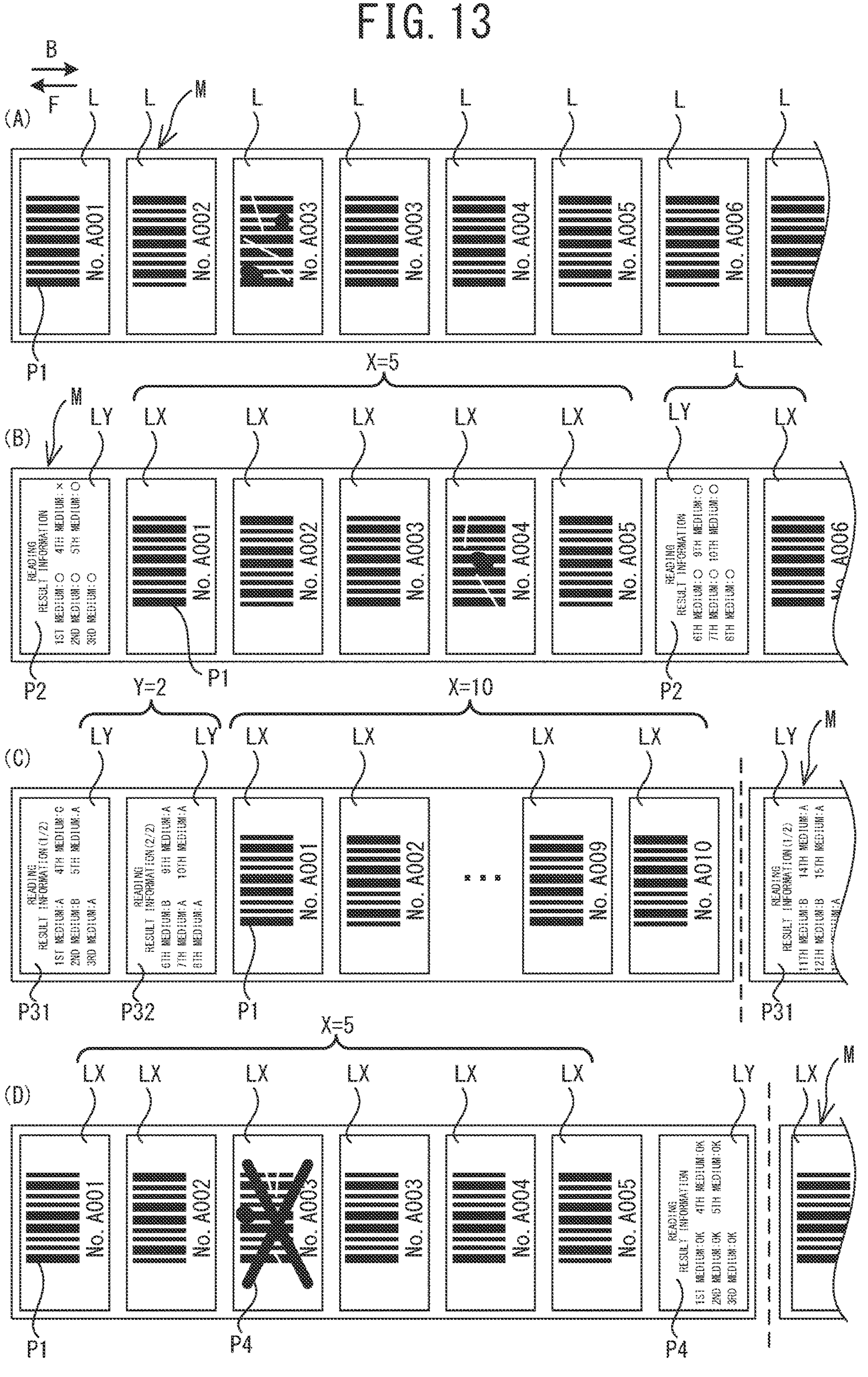
FIG. 13 is an explanatory diagram illustrating an example of a long medium when prescribed information is to be printed in ascending order on print media.

A database 80 that stores prescribed information to be printed by the print device 1 will be described with reference to FIG. 5. In the embodiment, the database 80 is stored in a PC connected to the print device 1 via the external device connection portion 242. In the print processing illustrated in FIG. 6 to be described later, the database 80 stores a plurality of pieces of the prescribed information to be printed on the plurality of print media L. In the embodiment, the prescribed information includes code information. The code information is image information representing a one-dimensional code. In the embodiment, the code information is image information representing a barcode that is the one-dimensional code. The database 80 stores the code information associated, respectively, with serial numbers indicated by "A001," "A002," . . . in a "No." field. The database 80 defines items to be printed on the print media L in coordination with the code information as "Other print items." In the embodiment, the other print items are the serial numbers shown under "No." Thus, in the embodiment, the prescribed information to be printed on the print media L includes the serial number and the code information corresponding to the serial number (refer to an image P1 in FIG. 13). The print media L on which the prescribed information has been printed are, for example, adhered to a given product, and are used in quality control of the product, or the like. The serial numbers correspond to a manufacturing order of the products, and are provided in ascending order. The database 80 stores the code information in association with the serial numbers arranged in ascending order. In other words, the database 80 stores the prescribed information in an operation order of an operation of adhering the print media L to the products. In the embodiment, the code information is encoded information of a variety of pieces information of the products, such as a manufacturer of the products, a date and time of manufacture, and the like.

Note that the print media L are adhered to the given products, and when the code information printed on the adhered print media L is used in the quality control or the like of the above-described product, a person conducting the quality control reads the code information using a barcode reader or the like that is held by the person. Thus, it is necessary for the code information to be printed on the print media L at a print quality that allows the code information to be accurately read using the barcode reader, or the like.

The print processing performed by the control portion 30 of the print device 1 will be described with reference to FIG. 6. The print processing is performed when a command is detected to print the prescribed information on the print media L. In the embodiment, the command to print the prescribed information is performed by the user via the operation portion 4. In the following description, each of steps of the processing are denoted by the abbreviation "S". At the start of the print processing, the long medium M is sandwiched by the first conveyance portion 7.

When the print processing is started, the control portion 30 determines whether to perform print settings (S1). The print settings are used to set various print specifications in order to print the prescribed information on the print media L using the print device 1. The control portion 30 displays an image, on the display portion 3, for selecting whether or not to perform the print settings, and prompts the user to input, using the operation portion 4, a command as to whether or not to perform the print settings. The control portion 30 acquires the command as to whether or not to perform the print settings that is input via the operation portion 4. When the user uses default print settings, or uses the print settings as they have been set the previous time, the user selects not to perform the print settings. When the command not to perform the print settings has been acquired (no at S1), the control portion 30 shifts the processing to a determination at S3.

When the command is acquired to perform the print settings (yes at S1), the control portion 30 performs print setting processing (S2), and shifts the processing to the determination at S3. The print setting processing is processing for performing the print settings.

The print setting processing (S2) illustrated in FIG. 6 will be described in detail with reference to FIG. 7. When the print setting processing is started, the control portion 30 acquires judgment result necessity information, which is information indicating whether or not it is necessary to print judgment result information on the print media L (S31). The control portion 30 displays, on the display portion 3, an image for selecting whether or not it is necessary to print the judgment result information on the print media L, and prompts the user to input the judgment result necessity information, via the operation portion 4. The control portion 30 acquires the judgment result necessity information input via the operation portion 4. The control portion 30 stores the acquired judgment result necessity information in the storage portion 31.

Using the reading portion 45, the print device 1 reads the prescribed information printed on the print medium L, and, on the basis of a reading result, which is the result that is read, judges the print quality of the print content of the prescribed information. The judgment result information is information indicating the judgment result of the print quality of the print content of the prescribed information, and indicates whether or not the print quality of the print content of the prescribed information printed on the print medium L is good, or indicates a level of the print quality. Whether or not the print quality is good, or the level of the print quality, is judged on the basis of a prescribed reference used in determining the print quality of the code information. A reference stored in advance in the storage portion 31 is used as the prescribed reference, or the prescribed reference is acquired from the external device via the external device connection portion 242. When the user has selected that it is necessary to print the judgment result information on the print media L, the print device 1 prints the judgment result information on the print media L. Hereinafter, of the print media L, the print media L on which the prescribed information is printed are referred to as first media LX, and the print media L on which the judgment result information is printed are referred to as second media LY. The first media LX include at least one of the print media L. The second media LY include at least one of the print media L. The second media LY are aligned upstream or downstream of the first media LX in the forward direction F, in a state in which the long medium M is disposed on the conveyance path Q. In other words, the first media LX and the second media LY are the print media L continuously aligned on the long medium M.

The control portion 30 determines whether or not the acquired judgment result necessity information indicates that it is necessary to print the judgment result information on the print media L (S32). When the judgment result necessity information indicates that is not necessary to print the judgment result information on the print media L (no at S32), the control portion 30 stores, in the storage portion 31, setting information indicating that each of settings relating to ascending order printing and no cutting are to be set (S38), which will be described later, and shifts the processing to S50.

When the judgment result necessity information indicates that it is necessary to print the judgment result information on the print media L (yes at S32), the control portion 30 acquires a zone number of the first media LX (S33). The zone number is a total number of the print media L on which the prescribed information is printed in one cycle of the print operation by the print device 1, and is a value showing a number smaller than a total print number. The print device 1 performs the printing of the prescribed information on the number of first media LX corresponding to the zone number, and prints, on the second medium LY, the judgment result information corresponding to the number of first media LX corresponding to the zone number. After that, the print device 1 repeats the printing of the prescribed information on the first media LX corresponding to the zone number and the printing of the judgment result information on the second media LY, until a total number of the first media LX on which the printing of the prescribed information has been performed reaches the total print number. In other words, as one zone of the first media LX corresponding to the zone number, the print device 1 prints, on the second media LY, the judgment result information for the plurality of first media LX included in the single zone. The control portion 30 displays an image on the display portion 3 prompting an input corresponding to the zone number, and prompts the user to input the zone number using the operation portion 4. The control portion 30 acquires the zone number input via the operation portion 4. Hereinafter, the total print number is indicated by Z. The zone number is indicated by X. The control portion 30 stores the acquired value of X in the storage portion 31.

The control portion 30 acquires a number of media of the second media LY (S35). The number of media indicates 1 or a multiple value. When the user selects "1" as the number of media, the number of second media LY is 1, and it is possible to select to print the judgment result information in summary form on one sheet of the second media LY, as the single second media LY. When the user selects "2" or more as the multiple number of media, it is possible to select to print the judgment result information in a divided manner on a plurality of sheets of the second media LY, as the plurality of second media LY. The control portion 30 displays an image on the display portion 3 prompting the input of the number of media, and prompts the user to input the number of media using the operation portion 4. The control portion 30 acquires the number of media input via the operation portion 4. Hereinafter, the number of media is indicated by Y. The control portion 30 stores the acquired value of Y in the storage portion 31.

The control portion 30 acquires one of whether to cause the second media LY to be arranged upstream with respect to the first media LX or to be arranged downstream with respect to the first media LX, in the forward direction F (S36). The control portion 30 displays, on the display portion 3, an image for selecting whether to cause the second media LY to be arranged upstream with respect to the first media LX or to be arranged downstream with respect to the first media LX, in the forward direction F, and prompts the user to select and input upstream or downstream using the operation portion 4. The control portion 30 acquires information indicating upstream or downstream input via the operation portion 4. The control portion 30 stores the acquired information in the storage portion 31.

The control portion 30 determines whether the winding device 29 is connected to the print device 1 (S39). When it is detected that the plug 29B of the winding device 29 is plugged into the winding device connection portion 241, the control portion 30 determines that the winding device 29 is connected to the print device 1. When it is determined that the winding device 29 is connected to the print device 1 (yes at S39), the control portion 30 stores, in the storage portion 31, setting information indicating that each of settings relating to descending order printing and no cutting are to be set (S48), which will be described later, and shifts the processing to S50. Hereinafter, the storing of various setting information relating to the print settings is referred to as "performing settings."

Subsequently, the control portion 30 rotates the shaft portion 29C of the winding device 29 in accordance with a drive amount of the conveyance drive portion (S49). When the conveyance drive portion conveys the long medium M in the forward direction F, the control portion 30 transmits, to the winding device 29, a command to rotate the shaft portion 29C in the counterclockwise direction in a front view. When the conveyance drive portion conveys the long medium M in the reverse direction B, the control portion 30 transmits, to the winding device 29, a command to rotate the shaft portion 29C in the clockwise direction in a front view. When stopping the conveyance of the long medium M by the conveyance drive portion, the control portion 30 transmits, to the winding device 29, a command to stop the rotation of the shaft portion 29C. The winding device 29 rotates or stops the shaft portion 29C in accordance with the power transmitted from the print device 1 and in accordance with the commands.

When it is determined that the winding device 29 is not connected to the print device 1 (no at S39), the control portion 30 determines whether to cause the printing of the prescribed information to be in ascending order or in descending order (S41). The control portion 30 displays, on the display portion 3, a screen for selecting whether to cause the printing of the prescribed information to be the ascending order printing or the descending order printing, and prompts the user to input, using the operation portion 4, whether or not to perform the ascending order printing or the descending order printing. The control portion 30 acquires information indicating the ascending order printing or the descending order printing input via the operation portion 4. When the acquired information indicates the ascending order printing, the control portion 30 determines that the prescribed information is to be printed in ascending order (yes at S41), and sets the ascending order printing (S42). When the acquired information indicates the descending order printing, the control portion 30 determines that the prescribed information is to be printed in descending order (no at S41), and sets the descending order printing (S43). The processing shifts to S45.

The ascending order printing refers to printing in which the prescribed information is obtained from the database 80 in ascending order (in the order of No. A001, No. A002, No. A003 . . . ), and the prescribed information is printed on the print media L in the acquired order. In the ascending order printing, the prescribed information is printed on the first media LX such that, in a state in which the long medium M is disposed on the conveyance path Q, the downstream side in the forward direction F is the upper side of an image, characters, or the like representing the prescribed information. Further, in the ascending order printing, when the judgment result information is to be printed, the judgment result information is printed on the second media LY such that the downstream side in the forward direction F is the upper side of characters and the like representing the judgment result information, as illustrated in FIG. 13B or FIG. 13C.

Figure 14:
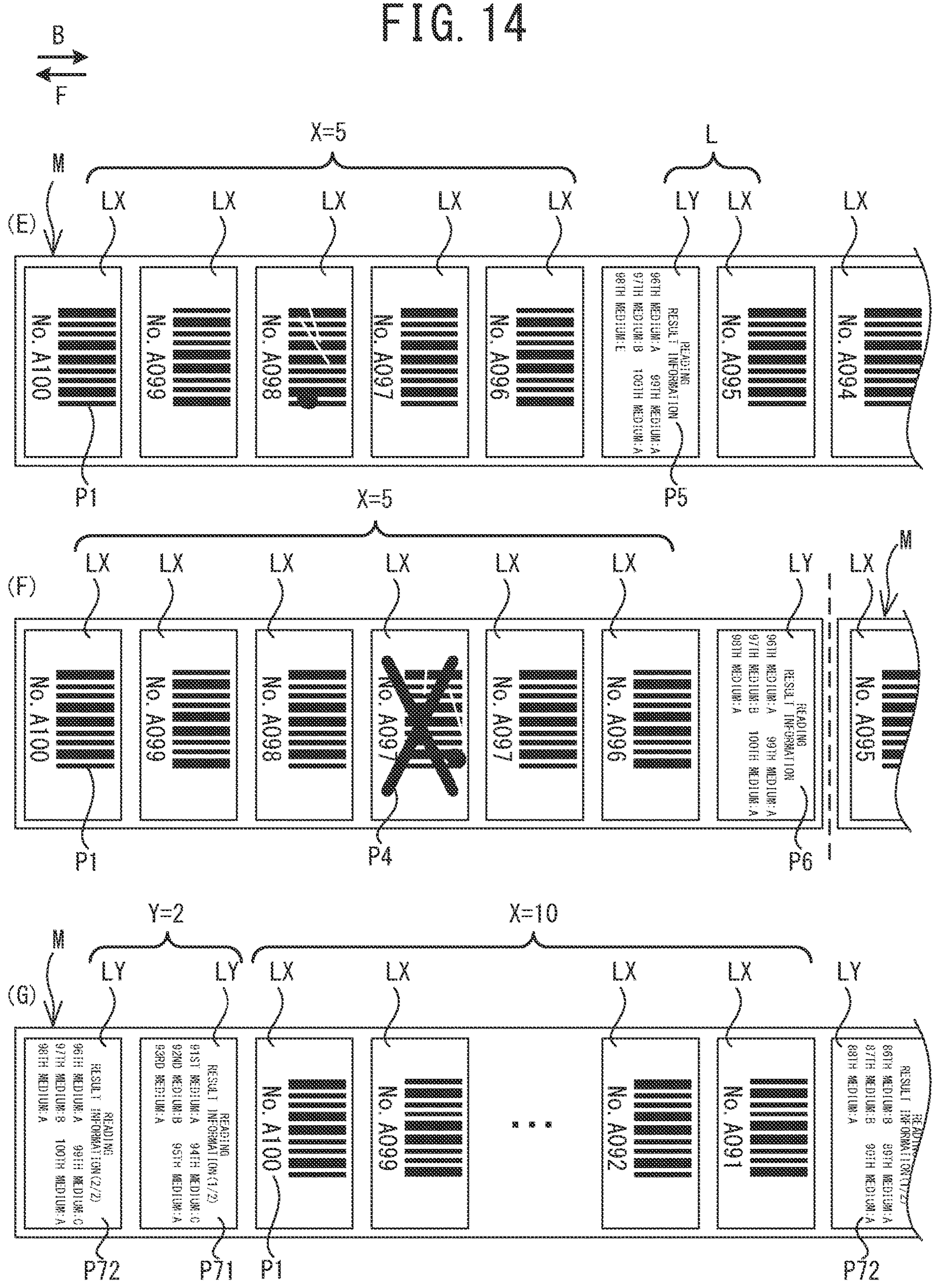
FIG. 14 is an explanatory diagram illustrating an example of the long medium when the prescribed information is to be printed in descending order on the print media.

The descending order printing refers to printing in which the prescribed information is obtained from the database 80 in descending order (in the order of No. A100, No. A0099, No. A0098 . . . when the total print number is 100), and the prescribed information is printed on the print media L in the acquired order. In the descending order printing, the prescribed information is printed on the first media LX such that, in the state in which the long medium M is disposed on the conveyance path Q, the upstream side in the forward direction F is the upper side of an image, characters, or the like representing the prescribed information. Further, in the descending order printing, when the judgment result information is to be printed, the judgment result information is printed on the second media LY such that the upstream side in the forward direction F is the upper side of characters and the like representing the judgment result information, as illustrated in FIG. 14E or the like. In this way, as illustrated in FIG. 13B, an image P2 that is the judgment result information of the first media LX of the numbers No. A001, No. A002, No. A003, No. A004, and No. A005 is printed in front of No. A001 on the long medium M, that is, on the second media LY positioned downstream in the conveyance direction. As illustrated in FIG. 13B, the image P2 that is the judgment result information of the first media LX of the numbers No. A006, No. A007, No. A008, No. A009, and No. A0010 is printed in front of No. A006, on the long medium M, that is, on the second media LY positioned downstream in the conveyance direction. The same applies from No. A011 onward. As illustrated in FIG. 13C, an image P31 that is the judgment result information of the first media LX of the numbers No. A001 to No. A005 is printed in front of No. A001 on the long medium M, that is, on the second media LY positioned downstream in the conveyance direction. An image P32 that is the judgment result information of the first media LX of the numbers No. A005 to No. A010 is printed in front of No. A001 on the long medium M, that is, is positioned downstream in the conveyance direction, and after the image P31, that is, on the second media LY positioned upstream in the conveyance direction. The same applies from No. A011 onward.

The control portion 30 determines whether to perform the cutting to cut the first media LX and the second media LY per zone (S45). "Perform the cutting per zone" means cutting, from the long medium M, the number of first media LX corresponding to the zone number, as a set with the second media LY on which the judgment result information corresponding to the first media LX corresponding to that zone number is printed. The control portion 30 displays, on the display portion 3, a screen for selecting whether or not to perform the cutting of the first media LX and the second media LY per zone, and prompts the user to input, using the operation portion 4, whether or not to perform the cutting per zone. The control portion 30 acquires information indicating whether or not to perform the cutting per zone, which is input via the operation portion 4. When the acquired information indicates to perform the cutting per zone, the control portion 30 determines to perform the cutting per zone (yes at S45), and sets cutting settings indicating to cut per zone (S46). When the acquired information indicates not to perform the cutting per zone, the control portion 30 determines not to perform the cutting per zone (no at S45), and sets non-cutting settings indicating that the cutting per zone is not to be performed (S47). The processing shifts to S50.

The control portion 30 acquires NG printing necessity information (S50). When it is judged that the print quality of the print content of the prescribed information printed on the print medium L is not good, the NG printing necessity information is information indicating whether it is necessary to perform judgment result NG printing, which is printing of content indicating that the print quality is not good, in an overwritten manner on the print medium L on which the prescribed information is printed and for which it has been judged that the print quality is not good. The control portion 30 displays, on the display portion 3, a screen for inputting the NG printing necessity information, and prompts the user to input the NG printing necessity information using the operation portion 4. The control portion 30 acquires the NG printing necessity information input via the operation portion 4. The control portion 30 stores the acquired NG printing necessity information in the storage portion 31. The control portion 30 returns the processing to the print processing.

The description will return to FIG. 6. In accordance with the determination at S1 or with ending the processing at S2, the control portion 30 determines whether to start the printing of the prescribed information on the print media L (S3). The control portion 30 displays, on the display portion 3, a screen for selecting whether to start the printing of the prescribed information on the print media L, and prompts the user to input, using the operation portion 4, a command as to whether or not to start the printing of the prescribed information on the print media L. The control portion 30 acquires the command as to whether or not to start the printing of the prescribed information on the print media L that is input via the operation portion 4. When the print settings are to be changed, or the like, the user inputs, using the operation portion 4, a command not to start the printing of the prescribed information on the print media L. When the command not to start the printing of the prescribed information on the print media L has been acquired (no at S3), the control portion 30 returns the processing to S1.

When the command to start the printing of the prescribed information on the print media L has been acquired (yes at S3), the control portion 30 acquires the total print number (S5). The control portion 30 displays, on the display portion 3, a screen for inputting the total print number, and prompts the user to input the total print number, using the operation portion 4. The control portion 30 acquires the total print number (the value of Z) input via the operation portion 4. As described above, Z is a value greater than X. The control portion 30 stores the acquired value of Z in the storage portion 31.

The control portion 30 determines whether the judgment result necessity information stored in the storage portion 31 indicates that it is necessary to print the judgment result information on the print media L (S6). When the judgment result necessity information indicates that it is not necessary to print the judgment result information on the print media L (no at S6), the control portion 30 controls the conveyance drive portion and starts the conveyance of the long medium M in the forward direction F (S11). Hereinafter, the conveying of the long medium M in the forward direction F is referred to as being fed forward, or as a forward feed. The control portion 30 controls the drive amounts of the first conveyance drive portion 9, the second conveyance drive portion 11, the third conveyance drive portion 38, the fourth conveyance drive portion 39, and the fifth conveyance drive portion 49, using the detection of the leading end of the long medium M by the medium detection portion 53 as a reference. In this way, the control portion 30 conveys each of the print media L on the long medium M to a predetermined position. Hereinafter, the position at which the print portion 6 is disposed on the conveyance path Q is referred to as a print position. The print position is a position at which the printing on the print medium L is started. A position at which the reading portion 45 is disposed on the conveyance path Q is referred to as a reading position. The reading position is a position at which the reading of the image corresponding to the print content of the print medium L is started. A position at which the cutting portion 50 is disposed on the conveyance path Q is referred to as a cutting position. The cutting position is a position that is substantially the same as the discharge port 21, on the conveyance path Q.

The control portion 30 adds 1 to and updates a value of N that is used to define which of the prescribed information to refer to, in the database 80 (S12). The value of N is stored in the storage portion 31, and the initial value of N, at a time point at which the print processing is started, is zero.

When the judgment result necessity information indicates that it is not necessary to print the judgment result information on the print media L, the setting of the ascending order printing is performed in the print setting processing. Each time the print medium L is fed forward to the print position, the control portion 30 controls the print portion 6 and prints the prescribed information on the print medium L (S13). In this processing, the control portion 30 refers to the database 80, acquires the N-th prescribed information in the database 80, and performs the printing of the acquired prescribed information on the print medium L. The print portion 6 forms the image of the prescribed information on the print medium L by discharging the liquid G from the nozzles 6*a* onto the print medium L that is fed forward. Further, along with continuing the forward feed, the control portion 30 controls the halogen lamp 41 of the fixing unit 40, and fixes the image of the prescribed information formed on the print medium L onto the print medium L.

The control portion 30 continues the forward feed and, in accordance with the print medium L on which the prescribed information is printed being conveyed to the reading position, the control portion 30 acquires, from the reading portion 45, the reading result of the print content of the prescribed information printed on the print medium L (S14). On the basis of the acquired reading result, the control portion 30 judges the print quality of the print content of the prescribed information printed on the print medium L (S15). The control portion 30 performs first print failure processing (S16). The first print failure processing is processing that performs judgment result NG printing, or the like, on the print medium L on which the prescribed information is printed and for which the print content has been judged to be not good, in accordance with the NG printing necessity information stored in the storage portion 31.

Figure 8:
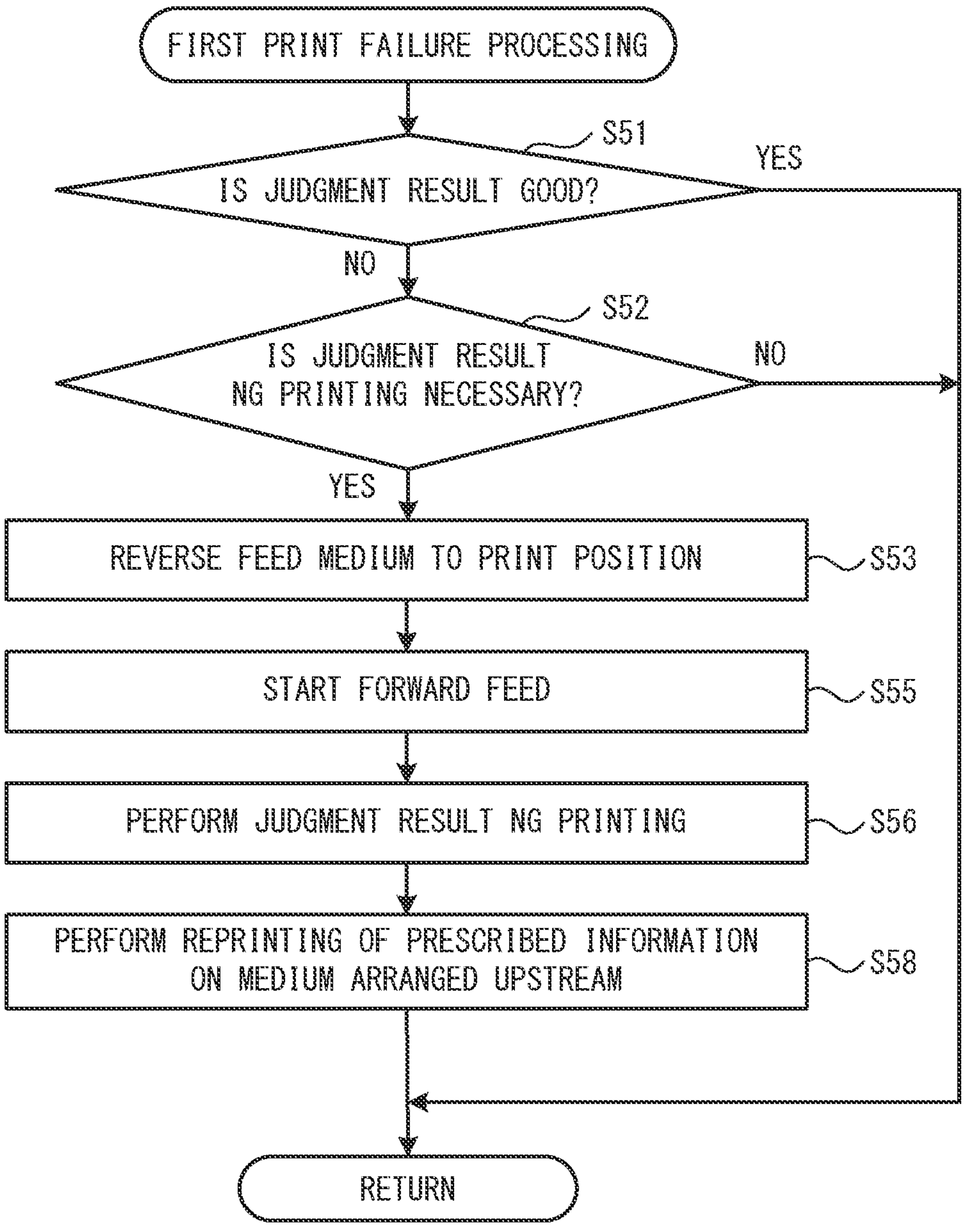
FIG. 8 is a flowchart of first print failure processing.

The first print failure processing (S16) illustrated in FIG. 6 will be described in detail with reference to FIG. 8. When the first print failure processing is started, the control portion 30 determines whether the judgment result at S15 illustrated in FIG. 6 indicates that the print quality of the print content of the prescribed information is good (S51). In the embodiment, the judgment of the print quality at S15 is indicated by two levels (good/not good), or by five levels (rank A to rank E). The print device 1 may store in advance a decision as to whether to perform the judgment using the two levels or the five levels, or the print device 1 may be configured such that the user can select whether to perform the judgment using the two levels or the five levels. When the judgment is performed using the two levels, a judgment result of OK indicates that the print quality of the print content of the prescribed information is good, and a judgment result of NG indicates that the print quality of the print content of the prescribed information is not good (is a failure). When the judgment is performed using the five levels, a judgment result of rank A to rank C indicates that the print quality of the print content of the prescribed information is good, and a judgment result of rank D to rank E indicates that the print quality of the print content of the prescribed information is not good (is the failure). When the judgment is performed using the five levels, a correspondence between a range of good and not good with the ranks can be adjusted as appropriate. For example, only rank A may be good, and the other ranks may be not good. When the judgment result is good (yes at S51), the control portion 30 returns the processing to the print processing.

When the judgment result is not good (no at S51), the control portion 30 determines whether it is necessary to perform the judgment result NG printing in the overwritten manner on the print medium L corresponding to the judgment result (S52). In other words, the control portion 30 determines whether the NG printing necessity information stored in the storage portion 31 indicates that the judgment result NG printing is necessary. When the NG printing necessity information stored in the storage portion 31 indicates that the judgment result NG printing is not necessary (no at S52), the control portion 30 returns the processing to the print processing.

When the NG printing necessity information stored in the storage portion 31 indicates that the judgment result NG printing is necessary (yes at S52), the control portion 30 stops the forward feed, and conveys the long medium M in the reverse direction B, in order to convey the print medium L, for which the print quality of the print content of the prescribed information is not good, to the print position (S53). Hereinafter, the conveying of the long medium M in the reverse direction B is referred to as reverse feeding or as a reverse feed. After reverse feeding the print medium L, for which the print quality of the print content of the prescribed information is not good, to the print position, the control portion 30 starts the forward feed (S55). The print portion 6 performs the judgment result NG printing on the print medium L that is being fed forward (S56). In the embodiment, the judgment result NG printing is performed by printing a reference sign P4 illustrated in FIG. 13D and FIG. 14F in an overwritten manner on the print medium L for which the print quality of the print content of the prescribed information is not good. In the embodiment, as illustrated in FIG. 13D and FIG. 14F, the reference sign P4 is an "X" indicating that the print quality content is not good. The reference sign P4 is printed in the overwritten manner on the image P1 of the barcode for which the print quality is not good. In this way, it is possible to indicate that the print quality of the image P1 of the barcode on which the reference sign P4 is printed in the overwritten manner is not good.

The control portion 30 continues the forward feed and once more performs, on the print medium L adjacent to and upstream, in the forward direction F, of the print medium L on which the judgment result NG printing has been performed, the printing of the prescribed information printed on the print medium L that has been subject to the judgment result NG printing (S58). In this processing, the control portion 30 acquires the N-th prescribed information in the database 80, and performs the printing of the acquired prescribed information on the print medium L. Hereinafter, performing the reprinting of the prescribed information printed on the print medium L that has been subject to the judgment result NG printing, on the print medium L adjacent to and upstream, in the forward direction F, of the print medium L on which the judgment result NG printing has been performed, is referred to as reprinting the prescribed information. The control portion 30 returns the processing to the print processing.

The description will return to FIG. 6. After performing the first print failure processing (S16), the control portion 30 updates a print execution number, which is a total number of the print media L on which the printing of the prescribed information has been performed (S18). Hereinafter, the print execution number is indicated by T. The value of T is stored in the storage portion 31, and the initial value of T, at the time point at which the print processing is started, is zero. The control portion 30 adds 1 to the value of T and updates the value of T, and stores the updated value of T in the storage portion 31. The control portion 30 determines whether the value of T is smaller than the value of Z (S19). When the value of T is smaller than the value of Z (yes at S19), the control portion 30 returns the processing to S12. When the value of T has reached the value of Z (no at S19), the control portion 30 ends the print processing.

FIG. 13A illustrates an example of the print result on the long medium M when the processing from S12 to S18 is repeatedly performed. As illustrated in FIG. 13A, the serial numbers "A001," "A002" . . . and the image P1, which is the code information, corresponding to the serial number are printed on the long medium M. Note that FIG. 13A illustrates an example in which the NG printing necessity information stored in the storage portion 31 indicates that it is not necessary to perform the judgment result NG printing (no at S52), and the judgment result NG printing and the reprinting of the prescribed information are not performed. Further, each of the examples illustrated in FIG. 13A, FIG. 13B, FIG. 13C, and FIG. 13D, and FIG. 14E, FIG. 14F, and FIG. 14G show the long medium M discharged from the discharge port 21. Each of the examples illustrated in FIG. 13A, FIG. 13B, FIG. 13C, and FIG. 13D are examples in which the ascending order printing is performed. Each of the examples illustrated in FIG. 14E, FIG. 14F, and FIG. 14G are examples in which the descending order printing is performed.

As illustrated in FIG. 13A, when the processing from S12 to S18 is repeatedly performed, since the printing of the prescribed information is performed in the ascending order on the plurality of print media L, a printing result is obtained in which the prescribed information is aligned in ascending order from downstream toward upstream in the forward direction F. When the judgment result NG printing and the reprinting of the prescribed information are not performed, if contamination, blurring, or the like of the print content occurs, the print medium L of that print content is discharged from the discharge port 21 as it is.

There is a possibility that the user who sees the print medium L on which the contamination, blurring, or the like has occurred may be anxious that the contamination, blurring, or the like may have occurred at a level that cannot be visually perceived on the print media L other than the print medium L on which the contamination, blurring, or the like has occurred, or that the user may have overlooked the other print media L on which the contamination, blurring, or the like has occurred. Further, there is a possibility that the user may be anxious as to whether a print failure at a level that cannot be visually perceived may have an impact on an ability to read using the barcode reader and the like, or may be anxious as to whether the judgment of the print quality of the print content of the prescribed information is being performed normally in the print device 1, and so on. Further, when the total print number is large, an operation to search, among the large number of print media L, for the print media L on which the print quality of the print content is not good is likely to become complex.

The description will return to FIG. 6. When the judgment result necessity information indicates that it is necessary to print the judgment result information on the print media L (yes at S6), the control portion 30 determines whether to arrange the second media LY downstream of the first media LX in the forward direction F (S21). The control portion 30 refers to the information indicating upstream or downstream stored in the storage portion 31, and when the referenced information indicates downstream (yes at S21), the control portion 30 performs first judgment result information print processing (S22).

The first judgment result information print processing (S22) illustrated in FIG. 6 will be described in detail with reference to FIG. 9. The first judgment result information print processing is performed in order to arrange the second media LY downstream of the first media LX in the forward direction F, on the long medium M. When the first judgment result information print processing is started, the control portion 30 starts the forward feed of the long medium M (S61). The control portion 30 continues the forward feed and feeds forward until, of the first media LX, the most downstream first medium LX in the forward direction F is at the print position (S62). In this processing, the control portion 30 feeds the second media LY forward to a position downstream of the print portion 6 in the forward direction F, without performing the printing on the second media LY arranged downstream of the first media LX in the forward direction F. Note that the number of the second media LY fed forward to the position downstream of the print portion 6 in the forward direction F without the printing being performed corresponds to the value of Y stored in the storage portion 31.

The control portion 30 adds 1 to and updates the value of N (S63). The control portion 30 performs the printing of the prescribed information on the first medium LX that has been fed forward to the print position (S64). In this processing, when the ascending order printing has been set, the control portion 30 refers to the database 80, acquires the N-th prescribed information in the database 80, and performs the printing of the acquired prescribed information on the print medium L. Further, when the descending order printing has been set, the control portion 30 refers to the database 80, acquires the (Z−(N−1))-th prescribed information in the database 80, and performs the printing of the acquired prescribed information on the first medium LX.

The control portion 30 continues the forward feed, and acquires, from the reading portion 45, the reading result of the prescribed information printed on the first medium LX conveyed to the reading position (S65). On the basis of the acquired reading result, the control portion 30 judges the print quality of the print content of the prescribed information printed on the first medium LX (S66). The control portion 30 stores the judgment result at S66 in the storage portion 31 (S68). At step S68, when the ascending order printing is set, the control portion 30 stores the judgment result at S66 in association with the value of N, in the storage portion 31. When the descending order printing is set, the control portion 30 stores the judgment result at S66 in association with the value of (Z−(N−1)), in the storage portion 31.

The control portion 30 performs second print failure processing (S69). The second print failure processing is processing that performs the judgment result NG printing, or the like, on the print medium L on which the prescribed information is printed and for which the print quality has been judged to be not good, in accordance with the NG printing necessity information stored in the storage portion 31. The second print failure processing is performed in the first judgment result information print processing and in second judgment result information print processing to be described later with reference to FIG. 12.

The second print failure processing (S69) illustrated in FIG. 9 will be described in detail with reference to FIG. 10. When the second print failure processing is started, the control portion 30 determines whether, of the judgment results of the print quality of the print content of the prescribed information printed on the first medium LX, the judgment result stored most recently in the storage portion 31 indicates that the print quality of the print content of the prescribed information is good (S91). When the judgment result is good (yes at S91), the control portion 30 returns the processing to the first judgment result information print processing or the second judgment result information print processing.

When the judgment result is not good (no at S91), the control portion 30 determines whether it is necessary to perform the judgment result NG printing in the overwritten manner on the first medium LX corresponding to the judgment result (S92). In other words, the control portion 30 determines whether the NG printing necessity information stored in the storage portion 31 indicates that the judgment result NG printing is necessary. When the NG printing necessity information stored in the storage portion 31 indicates that the judgment result NG printing is not necessary (no at S92), the control portion 30 returns the processing to the first judgment result information print processing or the second judgment result information print processing.

When the NG printing necessity information stored in the storage portion 31 indicates that the judgment result NG printing is necessary (yes at S92), the control portion 30 stops the forward feed and reverse feeds the long medium M, in order to convey the first medium LX, for which the print quality of the print content of the prescribed information is not good, to the print position (S93). After reverse feeding the first medium LX, for which the print quality of the print content of the prescribed information is not good, to the print position, the control portion 30 starts the forward feed (S94). The control portion 30 continues the forward feed, controls the print portion 6, and performs the judgment result NG printing (the printing in the overwritten manner of the reference sign P4 illustrated in FIG. 13D and FIG. 14F) on the first medium LX that is fed forward (S95).

The control portion 30 continues the forward feed, and performs the reprinting of the prescribed information printed on the first medium LX that has been subject to the judgment result NG printing, on the print medium L aligned adjacent to and upstream of, in the forward direction F, the first medium LX on which the judgment result NG printing has been performed (S96). Subsequently, the print medium L that has been subject to the reprinting of the prescribed information is also dealt with as the first medium LX. In this processing, when the ascending order printing is set, the control portion 30 acquires the N-th prescribed information in the database 80, and performs the reprinting of the acquired prescribed information. When the descending order printing is set, the control portion 30 acquires the (Z−(N−1))-th prescribed information in the database 80, and performs the reprinting of the acquired prescribed information.

The control portion 30 continues the forward feed and, in accordance with the first medium LX on which the reprinting of the prescribed information has been performed being conveyed to the reading position, acquires the reading result of the print content of the prescribed information printed on the first medium LX from the reading portion 45 (S97). On the basis of the acquired reading result, the control portion 30 judges the print quality of the print content of the prescribed information printed on the first medium LX (S98). The control portion 30 stores the judgment result at S98 in the storage portion 31 (S99). When the ascending order printing is set, the control portion 30 stores the judgment result at S99 in association with the value of N, in the storage portion 31. When the descending order printing is set, the control portion 30 stores the judgment result at S99 in association with the value of (Z−(N−1)), in the storage portion 31. In other words, the control portion 30 updates the judgment result stored in the storage portion 31 in association with the value of N or the value of (Z−(N−1)). The control portion 30 returns the processing to the first judgment result information print processing or the second judgment result information print processing.

The description will return to FIG. 9. After performing the second print failure processing (S69), the control portion 30 updates a zone print number indicating the number of the first media LX on which the printing of the prescribed information is complete, of the first media LX in a single zone (S71). Hereinafter, the zone print number is indicated by E. The value of E is stored in the storage portion 31, and the initial value of E, at the time point at which the print processing is started, is zero. The control portion 30 adds 1 to and updates the value of E, and stores the updated value of E in the storage portion 31. The control portion 30 determines whether the value of E is smaller than the value of X (S72). When the value of E is smaller than the value of X (yes at S72), the control portion 30 returns the processing to S63.

When the value of E has reached the value of X (no at S72), the control portion 30 clears the value of E to zero, and reverse feeds the long medium M, in order to convey the second medium LY that is arranged downstream, in the forward direction F, of the first medium LX on the long medium M, to the print position (S73). When there are a plurality of the second media LY, in other words, when the value of Y is 2 or more, the control portion 30 performs the reverse feed such that the second medium LY that is arranged furthest downstream in the forward direction F is disposed at the print position. After performing the reverse feed such that the second medium LY is disposed at the print position, the control portion 30 starts the forward feed (S75). The control portion 30 continues the forward feed, controls the print portion 6, and prints the judgment result information on the second medium LY (S76). When the ascending order printing is being performed on the first media LX, in a similar manner to the prescribed information, the image representing the judgment result information is printed on the second medium LY such that the upper side of the image is on the downstream side in the forward direction F. When the descending order printing is being performed on the first media LX, in a similar manner to the prescribed information, the image representing the judgment result information is printed on the second medium LY such that the upper side of the image is printed on the upstream side in the forward direction F.

FIG. 13B illustrates an example of a printing result on the long medium M when, in the case of performing the ascending order printing, the first media LX consist of five of the print media L (X=5), and the second media LY consist of one of the print media L (Y=1). The second medium LY is arranged downstream of the first media LX in the forward direction F. Note that FIG. 13B illustrates an example of a case in which the NG printing necessity information stored in the storage portion 31 indicates that the judgment result NG printing is not necessary (no at S52), and the judgment result NG printing and the reprinting of the prescribed information are not performed. In this example, it is assumed that contamination and blurring occurs in the print content of the 4-th prescribed information in the database 80.

When the ascending order printing is performed, at S68, the control portion 30 has stored the judgment result acquired at S66 in association with the value of N, in the storage portion 31. As illustrated by the image P2, the judgment result information indicates the judgment result of the print quality of the print content of the prescribed information of the five first media LX in which "1st medium:", "2nd medium:", . . . "5th medium:" are associated with identification information identifying each of the five first media LX included in the single zone. The sections of numerals indicating the "1st medium:", "2nd medium:", . . . "5th medium:" correspond to the values of N stored in the storage portion 31 in association with the judgment result at S66. In the image P2, the judgment result for the print content of the prescribed information of the first media LX is "O" or "X." "O" is a symbol indicating that the judgment result is good, and "X" is a symbol indicating that the judgment result is not good. By verifying the long medium M illustrated in FIG. 13B, the user can recognize that the judgment result corresponding to the first medium LX that is fourth from upstream in the forward direction F, of the five first media LX, indicates not good, and the judgment result corresponding to the remaining first media LX indicates good. Further, in a similar manner to the prescribed information, the image P2 is printed on the second medium LY such that the upper side of the image P2 is on the downstream side in the forward direction F, and thus, the user can view, at a glance, the print content of the five first media LX and the corresponding judgment results from the same direction.

FIG. 13C illustrates an example of a printing result on the long medium M when, in the case of performing the ascending order printing, the first media LX consist of ten of the print media L (X=10), and the second media LY consist of two of the print media L (Y=2). The second media LY are arranged downstream of the first media LX in the forward direction F. In the example illustrated in FIG. 13C, the judgment results for the print content of the prescribed information of the first media LX are divided into two images, that is, the images P31 and P32, and P31 and P32 are formed by two of the second media LY, respectively. For example, when the zone number (X) of the first media LX is relatively large in relation to the size of the print medium L, a size of characters and the like used to represent the judgment result information printed on the second medium LY is likely to become small. Since the print device 1 causes the user to select a media number (Y) of the second media LY, it is possible to cause a format, such as the size of the characters and the like used to represent the judgment result information printed on the second medium LY, to match a format desired by the user. In the example illustrated in FIG. 13C, the judgment result information indicates the five levels using the characters A to E. In this case, the print device 1 can specifically indicate the print quality of the prescribed information to a greater extent than when the judgment result information is indicated using the two levels of good/not good.

The description will return to FIG. 9. The control portion 30 performs the cutting processing (S78). The cutting processing is processing for cutting, from the long medium M, the number of first media LX corresponding to the zone number, and the second media LY on which is printed the judgment result information corresponding to the number of first media LX corresponding to that zone number, as a set for each of the zones.

Figure 11:
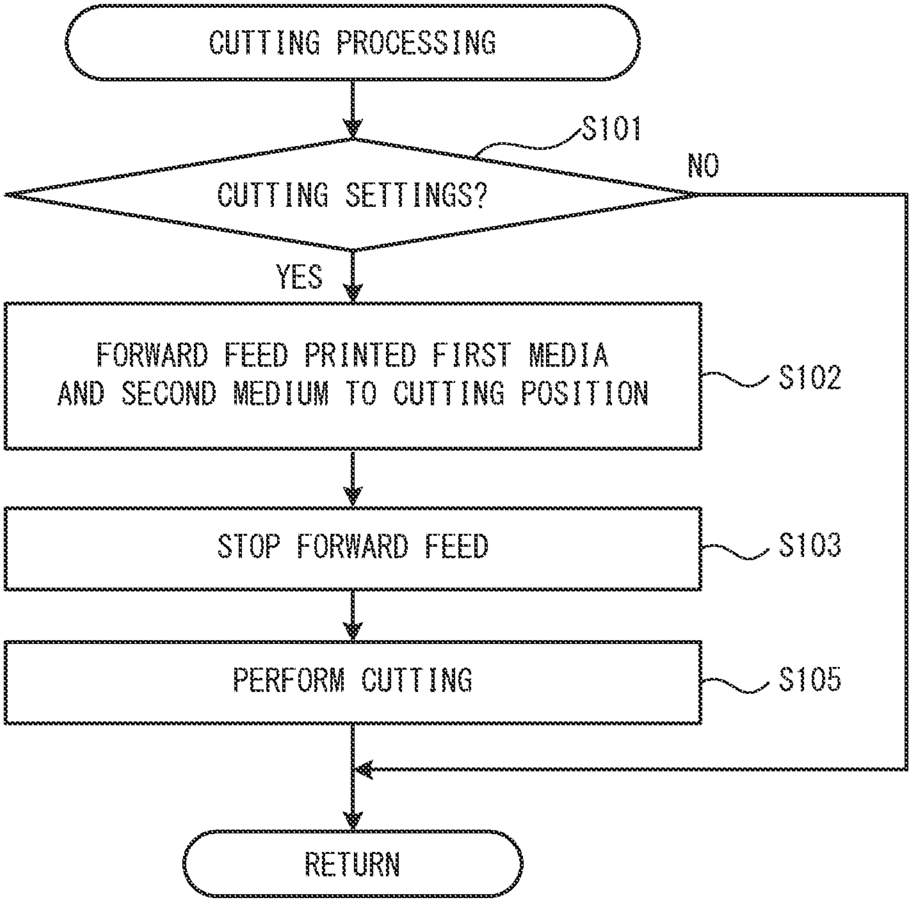
FIG. 11 is a flowchart of cutting processing.

The cutting processing (S78) illustrated in FIG. 9 will be described in detail with reference to FIG. 11. The cutting processing is performed in the first judgment result information print processing, and in the second judgment result information print processing to be described later with reference to FIG. 12. When the cutting processing is started, the control portion 30 determines whether a cutting setting has been set (S101). When the cutting setting has not been set, or when a non-cutting setting has been set (no at S101), the control portion 30 returns the processing to the first judgment result information print processing or the second judgment result information print processing.

When the cutting setting has been set (yes at S101), the control portion 30 continues the forward feed in order to cut the X number of first media LX on which the prescribed information has been printed, and the Y number of second media LY on which the judgment result information has been printed, as a set (S102). The control portion 30 stops the forward feed in accordance with the fact that, of the X number of first media LX and the Y number of second media LY, the upstream side, in the forward direction F, of the print medium L arranged most upstream in the forward direction F is disposed at the cutting position (S103). The control portion 30 controls the cutting portion 50 and cuts the X number of first media LX and the Y number of second media LY, as a set, from the long medium M (S105). The set of the first media LX and the second media LY cut from the long medium M is discharged from the discharge port 21. The control portion 30 returns the processing to the first judgment result information print processing or the second judgment result information print processing.

FIG. 13C illustrates an example in which the ten first media LX and the two second media LY arranged downstream, in the forward direction F, of the ten first media LX are cut from the long medium M at a position indicated by a dotted line. In this case, since the first media LX and the second media LY are cut as a set, the print device 1 can allow the user to easily view, at a glance, which of the first media LX are the target of the judgment result information printed on the second media LY.

The description will return to FIG. 9. After performing the cutting processing (S78), the control portion 30 updates the print execution number (S81). The control portion 30 adds the value of X to the value of T and updates the value of T, and stores the updated value of T in the storage portion 31. Note that the number of first media LX for which the judgment result NG printing has been performed is not added to the value of T. The control portion 30 determines whether the value of T is smaller than the value of Z (S82).

When the value of T is smaller than the value of Z (yes at S82), the control portion 30 conveys the print medium L arranged adjacent to and upstream, in the forward direction F, of the printed first media LX and second media LY, to the print position (S83). When, in the cutting processing (S78), the first media LX and the second media LY have been cut from the long medium M as a set, the print medium L arranged adjacent to and upstream, in the forward direction F, of the printed first media LX and second media LY is positioned downstream of the print position in the forward direction F. In this case, in the processing at S83, the control portion 30 reverse feeds the long medium M such that the print medium L arranged adjacent to and upstream, in the forward direction F, of the printed first media LX and second media LY, is disposed at the print position. When, in the cutting processing (S78), the first media LX and the second media LY have not been cut from the long medium M as a set, the print medium L arranged adjacent to and upstream, in the forward direction F, of the printed first media LX and second media LY is positioned upstream of the print position in the forward direction F. In this case, in the processing at S83, the control portion 30 continues the forward feed of the long medium M such that the print medium L arranged adjacent to and upstream, in the forward direction F, of the printed first media LX and second media LY, is disposed at the print position. The control portion 30 returns the processing at S61.

Figure 6:
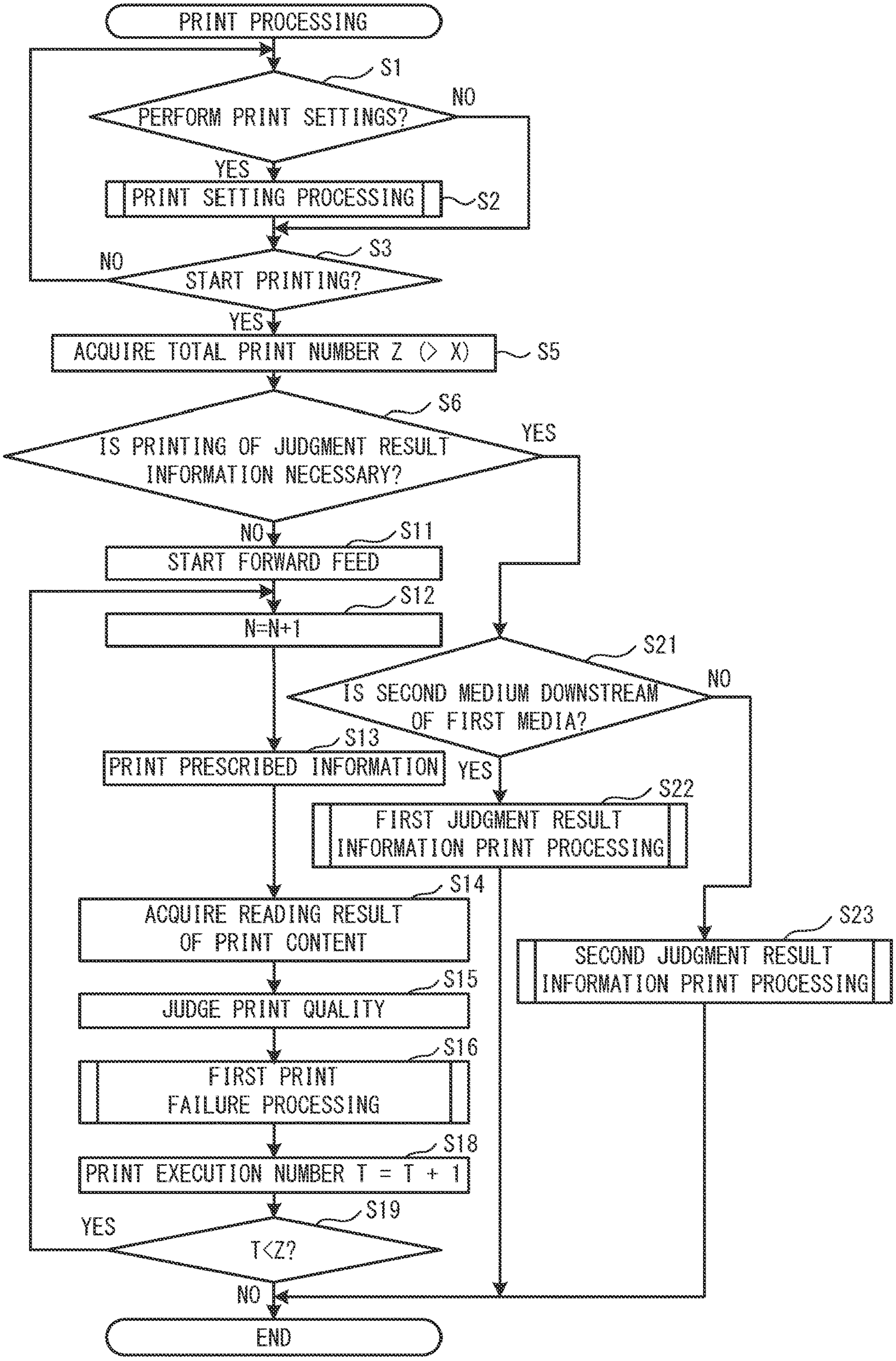
FIG. 6 is a flowchart of print processing.
Figure 7:
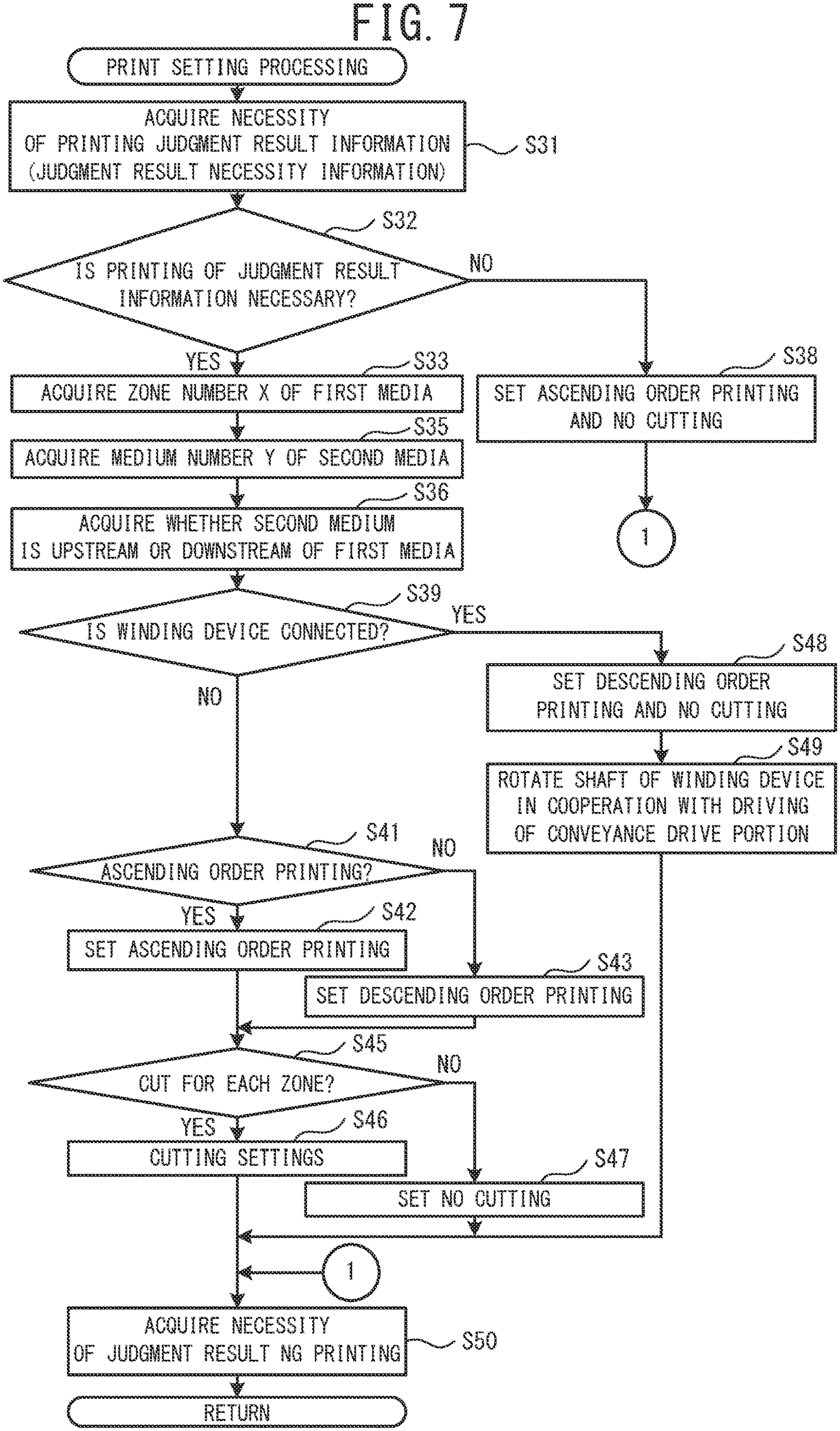
FIG. 7 is a flowchart of print setting processing.

When the value of T has reached the value of Z (yes at S82), the control portion 30 returns the processing to the print processing illustrated in FIG. 6. After that, the control portion 30 ends the print processing.

The description will return to FIG. 6. The control portion 30 refers to the information indicating whether upstream or downstream is stored in the storage portion 31, and, when the referenced information indicates upstream (no at S21), the control portion 30 performs the second judgment result information print processing (S23).

Figure 12:
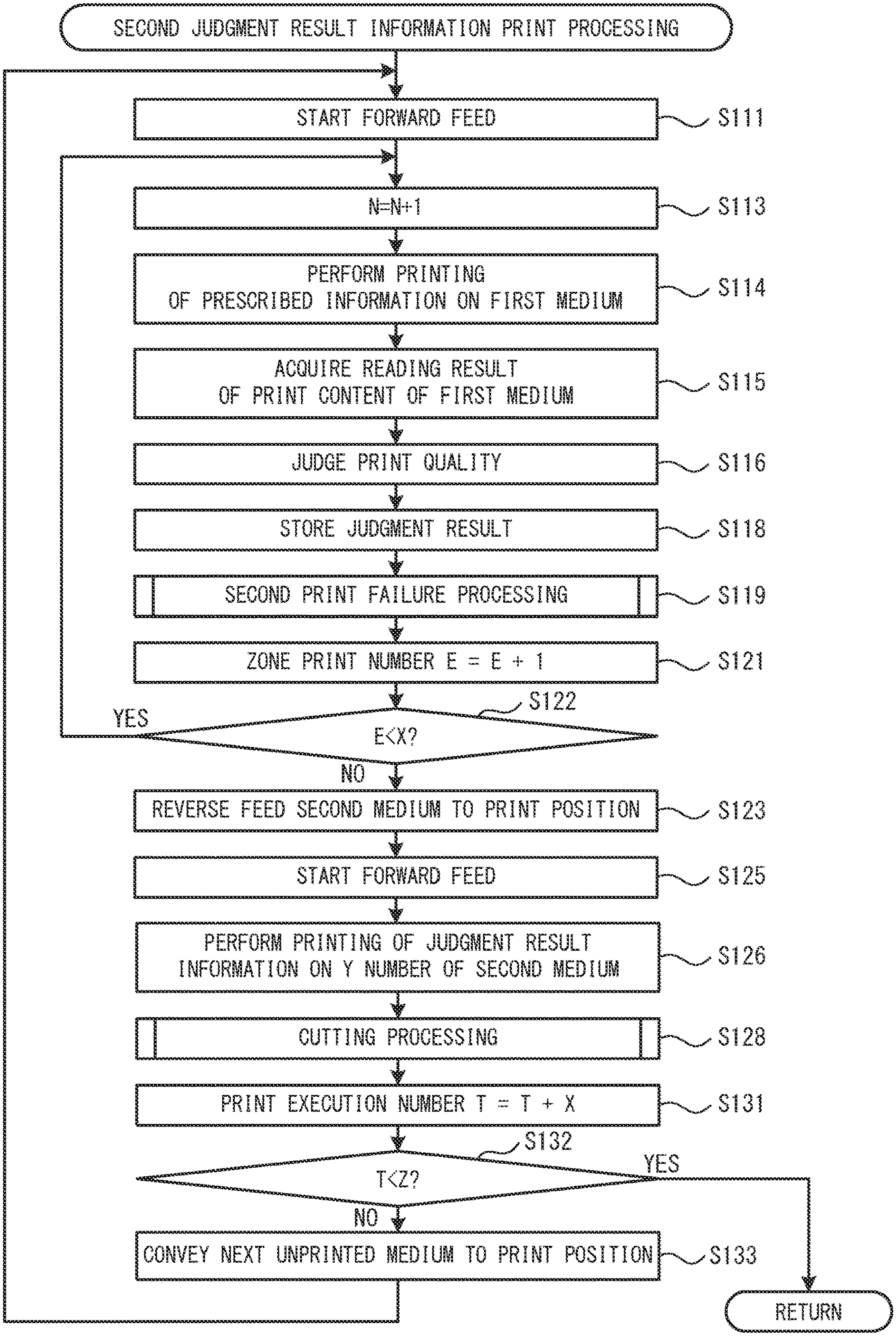
FIG. 12 is a flowchart of second judgment result information print processing.

The second judgment result information print processing (S21) illustrated in FIG. 6 will be described in detail with reference to FIG. 12. The second judgment result information print processing is processing for arranging the second media LY upstream of the first media LX in the forward direction F, on the long medium M. When the second judgment result information print processing is started, the control portion 30 starts the forward feed of the long medium M (S111). The control portion 30 adds 1 to and updates the value of N (S113). The control portion 30 prints the prescribed information on the first medium LX fed forward to the print position (S114). In a similar manner to the first judgment result information print processing, when the ascending order printing is set, the control portion 30 refers to the database 80, acquires the N-th prescribed information in the database 80, and performs the printing of the acquired prescribed information on the print medium L. Further, when the descending order printing is set, the control portion 30 refers to the database 80, acquires the (Z−(N−1))-th prescribed information in the database 80, and performs the printing of the acquired prescribed information on the first medium LX.

The control portion 30 continues the forward feed and acquires, from the reading portion 45, the reading result of the prescribed information printed on the first medium LX conveyed to the reading position (S115). On the basis of the acquired reading result, the control portion 30 judges the print quality of the print content of the prescribed information printed on the first medium LX (S116). The control portion 30 stores the judgment result at S115 in the storage portion 31 (S118). At S118, when the ascending order printing is set, the control portion 30 stores the judgment result at S116 in association with the value of N, in the storage portion 31. When the descending order printing is set, the control portion 30 stores the judgment result at S116 in association with the value of (Z−(N−1)), in the storage portion 31.

The control portion 30 performs the second print failure processing described above (S119). The control portion 30 adds 1 to and updates the zone print number (the value of E) (S121). The control portion 30 stores the updated value of E in the storage portion 31. The control portion 30 determines whether the value of E is smaller than the value of X (S122). When the value of E is smaller than the value of X (yes at S122), the control portion 30 returns the processing to S113.

In the embodiment, on the conveyance path Q, since the fixing unit 40 is disposed between the print portion 6 and the reading portion 45, an interval between the print position and the reading position is an interval in which one or more of the print media L are arranged on the long medium M. Thus, in the course of the processing at S114 and S115 being performed, the second medium LY is conveyed to a position downstream of the print portion 6 in the forward direction F, in a state of no printing being performed. When the value of E has reached the value of X (no at S122), the control portion 30 clears the value of E to zero and reverse feeds the long medium M, in order to convey the second medium LY arranged upstream of the first medium LX in the forward direction F on the long medium M to the print position (S123). When there are the plurality of the second media LY, in other words, when the value of Y is 2 or more, the control portion 30 performs the reverse feed such that the second medium LY that is arranged furthest downstream in the forward direction F is disposed at the print position. Note that an amount of the reverse feed of the long medium M at S123 is smaller than an amount of the reverse feed at S73 in the first judgment result information print processing.

After performing the reverse feed such that the second medium LY is disposed at the print position, the control portion 30 starts the forward feed (S125). The control portion 30 continues the forward feed, controls the print portion 6, and prints the judgment result information on the second medium LY (S126). When the ascending order printing is being performed on the first media LX, in a similar manner to the prescribed information, the image representing the judgment result information is printed on the second medium LY such that the upper side of the image is on the downstream side in the forward direction F. When the descending order printing is being performed on the first media LX, in a similar manner to the prescribed information, the image representing the judgment result information is printed on the second medium LY such that the upper side of the image is printed on the upstream side in the forward direction F.

FIG. 14E illustrates an example of a printing result on the long medium M when, in the case of performing the descending order printing, the first media LX consist of five of the print media L (X=5), and the second media LY consist of one of the print media L (Y=1). The second medium LY is arranged upstream of the first media LX in the forward direction F. It is assumed that the total print number (the value of Z) is 100. Note that FIG. 14E illustrates an example of a case in which the NG printing necessity information stored in the storage portion 31 indicates that the judgment result NG printing is not necessary (no at S52), and the judgment result NG printing and the reprinting of the prescribed information is not performed. In this example, it is assumed that contamination and blurring occurs in the print content of the (Z−(N−1))=(100−(3−1))=98-th prescribed information in the database 80.

When the descending order printing is performed, the control portion 30 stores the judgment result acquired at S116 in association with the value of (Z−(N−1)), in the storage portion 31. As illustrated by an image P5, the judgment result information indicates the judgment result for the print content of the prescribed information of the five first media LX in which "96th medium:", "97th medium:", . . . "100th medium:" are associated with the identification information identifying each of the five first media LX included in the single zone. The sections of numerals of the "96th medium:", "97th medium:", . . . "100th medium:" correspond to the values of (Z−(N−1)) stored in the storage portion 31 in association with the judgment result at S116. In the image P5, the judgment results for the print content of the prescribed information of the first media LX are indicated by five levels "A" to "E." By verifying the long medium M illustrated in FIG. 14E, the user can recognize that the judgment result corresponding to the first medium LX that is third from downstream in the forward direction F, of the five first media LX is a rank of "E," and the judgment results corresponding to the remaining first media LX are ranks of "A" or "B." Further, in a similar manner to the prescribed information, the image P5 is printed on the second medium LY such that the upper side of the image P5 is on the upstream side in the forward direction F, and thus, the user can view, at a glance, the print content of the five first media LX and the corresponding judgment results from the same direction.

Further, when the winding device 29 is connected to the print device 1, since the descending order printing is performed using the non-cutting setting (S48), the print device 1 outputs the printing result as illustrated in FIG. 14E. The winding device 29 rotates the shaft portion 29C, and winds the long medium M onto the core mounted on the shaft portion 29C, at a position downstream of the reading portion 45 in the forward direction F. In this case, the serial numbers printed on the first media LX are arranged in ascending order (the prescribed information is arranged in an operation order) from the outside toward the inside of the long medium M wound onto the core. After ending the print processing, the user can adhere the print media L on which the prescribed information has been printed to the products in order, while feeding out, from the outside, the long medium M wound onto the core by the shaft portion 29C. In this adhering operation, the user can advance the operation while verifying the judgment result information printed on the second media LY.

The description will return to FIG. 12. The control portion 30 performs the cutting processing described above (S128). FIG. 14F illustrates an example of a printing result on the long medium M when, in the case of performing the descending order printing, the first media LX consist of five of the print media L (X=5), and the second media LY consist of one of the print media L (Y=1). The second media LY are arranged upstream of the first media LX in the forward direction F. In the example illustrated in FIG. 14F, it is assumed that the cutting setting is set (yes at S101). Note that FIG. 14F illustrates an example of a case in which the NG printing necessity information stored in the storage portion 31 indicates that the judgment result NG printing is necessary (yes at S52), and the judgment result NG printing and the reprinting of the prescribed information are performed. In FIG. 14F, the five first media LX on which the prescribed information is printed at the good quality (the six first media LX, if including the first medium LX on which the prescribed information is printed for which the print quality is not good) and the one second medium LY arranged upstream, in the forward direction F, of the six first media LX are cut from the long medium M at a position indicated by a dotted line.

In this case, as illustrated in FIG. 14F, the print device 1 can easily cause the user to view, at a glance, which of the first media LX are the target of an image P6 of the judgment result information printed on the second medium LY. Further, in the example illustrated in FIG. 14F, the printing of the prescribed information is performed using the descending order printing. During a period until the print processing is complete, the user receives and accumulates, in a tray or the like, the first media LX and the second media LY cut as a set from the long medium M. Each of the accumulated sets of the first media LX and the second media LY are in a state of being sorted such that the serial numbers are in ascending order, from top to bottom (the prescribed information is arranged in the operation order). After the print processing is complete, the user can manually pick up, in order from the top, the first media LX and second media LY that are accumulated in the tray or the like after being cut, and can adhere the print media L on which the prescribed information has been printed, to the products in order. In the adhering operation, the user can advance the operation while verifying the print quality of the prescribed information on the number of first media LX corresponding to the zone number, on the basis of the judgment result information printed on the second media LY.

The description will return to FIG. 12. The control portion 30 adds the value of X to the print execution number (the value of T) and updates the value of T (S131). The control portion 30 stores the updated value of T in the storage portion 31. The control portion 30 determines whether the value of T is smaller than the value of Z (S132).

When the value of T is smaller than the value of Z (yes at S132), the control portion 30 conveys the print medium L arranged adjacent to and upstream, in the forward direction F, of the printed first media LX and second media LY to the print position (S133). When, in the cutting processing (S128), the first media LX and the second media LY have been cut from the long medium M as a set, the print medium L arranged adjacent to and upstream, in the forward direction F, of the printed first media LX and second media LY is positioned downstream of the print position in the forward direction F. In this case, in the processing at S133, the control portion 30 reverse feeds the long medium M such that the print medium L arranged adjacent to and upstream, in the forward direction F, of the printed first media LX and second media LY, is disposed at the print position. When, in the cutting processing (S128), the first media LX and the second media LY have not been cut from the long medium M as a set, the print medium L arranged adjacent to and upstream, in the forward direction F, of the printed first media LX and second media LY is positioned upstream of the print position in the forward direction F. In this case, in the processing at S133, the control portion 30 continues the forward feed of the long medium M such that the print medium L arranged adjacent to and upstream, in the forward direction F, of the printed first media LX and second media LY, is disposed at the print position. The control portion 30 returns the processing to S111.

When the value of T has reached the value of Z (yes at S132), the control portion 30 returns the processing to the print processing illustrated in FIG. 6. After that, the control portion 30 ends the print processing.

As described above, when the code information is printed on the print media L, there is a demand for the print quality to be good. Thus, it is necessary for the user to identify, from the plurality of print media L on which the printing has been performed, the print medium L for which the print quality is not good, and to perform an operation to remove the identified print medium L, and the like. Each time the prescribed information is printed on the number of first media LX corresponding to the zone number that is smaller than the total print number, the print device 1 prints the judgment result information, which indicates the judgment result for the reading result of each of the number of first media LX corresponding to the zone number, on the second medium LY arranged upstream or downstream of the first media LX in the forward direction F. On the basis of the judgment result information printed on the second medium LY, the user can identify, from the number of first media LX corresponding to the zone number, the print medium L that should be identified. Thus, even when the total print number is a large amount, the print device 1 can easily identify the print medium L that should be identified. Further, the print device 1 does not need to store the reading result for all the print media L corresponding to the total print number in the storage portion 31 in order to generate the judgment result information, and it is sufficient that the print device 1 stores the reading result for the number of first media LX corresponding to the zone number in the storage portion 31. As a result, the print device 1 can reduce costs of the print device 1, since it is not necessary to increase a storage capacity of the storage portion 31.

As illustrated by the image P2 in FIG. 13B, the judgment result information indicates the judgment result acquired by the processing at S66 or S116, in association with the identification information of each of the number of first media LX corresponding to the zone number. The identification information is the information identifying each of the five first media LX included in the single zone, as the "1st medium:", "2nd medium:", . . . "5th medium:". The judgment result may be a character or a symbol representing the print quality using two levels, such as "O" or "X", or "OK" or "NG". Further, the judgment result may be a character or symbol representing a degree of the print quality, such as the five level ranks from "A" to "E". The print device 1 indicates the print quality of each of the number of first media LX corresponding to the zone number along with the identification information, and can thus cause the user to specifically ascertain the print quality of each of the first media LX.

After performing the judgment of the print quality with respect to the number of first media LX corresponding to the zone number, the print device 1 reverse feeds, to the print position, the second medium LY that has been fed forward, without being printed, to a position further downstream, in the forward direction F, than the print position, and then prints the judgment result information on the second medium LY that has been reverse fed. The second medium LY is arranged downstream of the first media LX in the forward direction F. Thus, after visually checking the second medium LY, the user easily recognizes the print quality of the number of first media LX corresponding to the zone number. As a result, the print device 1 can reduce an operation burden on the user to identify, from the number of first media LX corresponding to the zone number, the first medium LX that should be identified.

Figure 9:
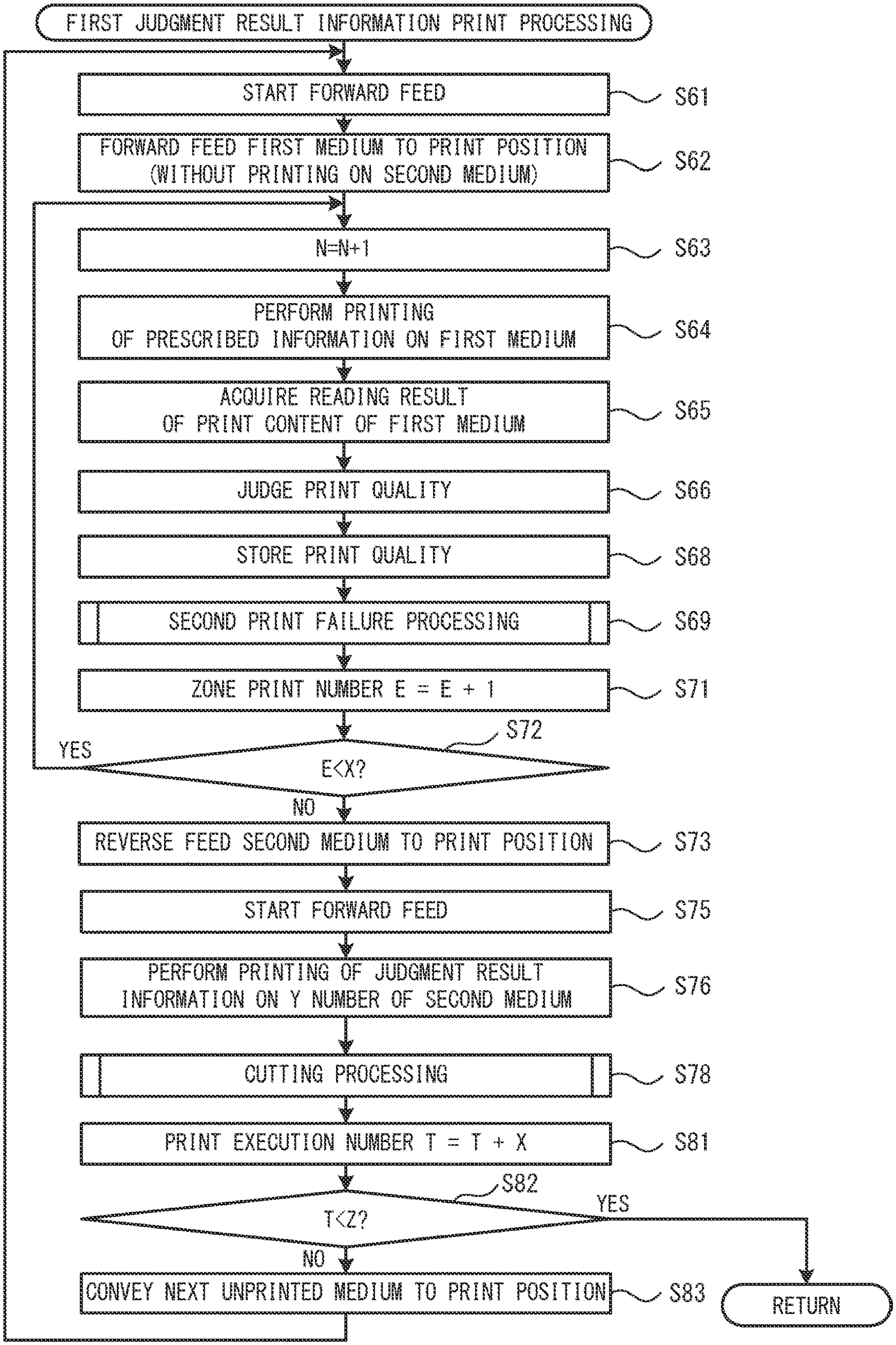
FIG. 9 is a flowchart of first judgment result information print processing.
Figure 10:
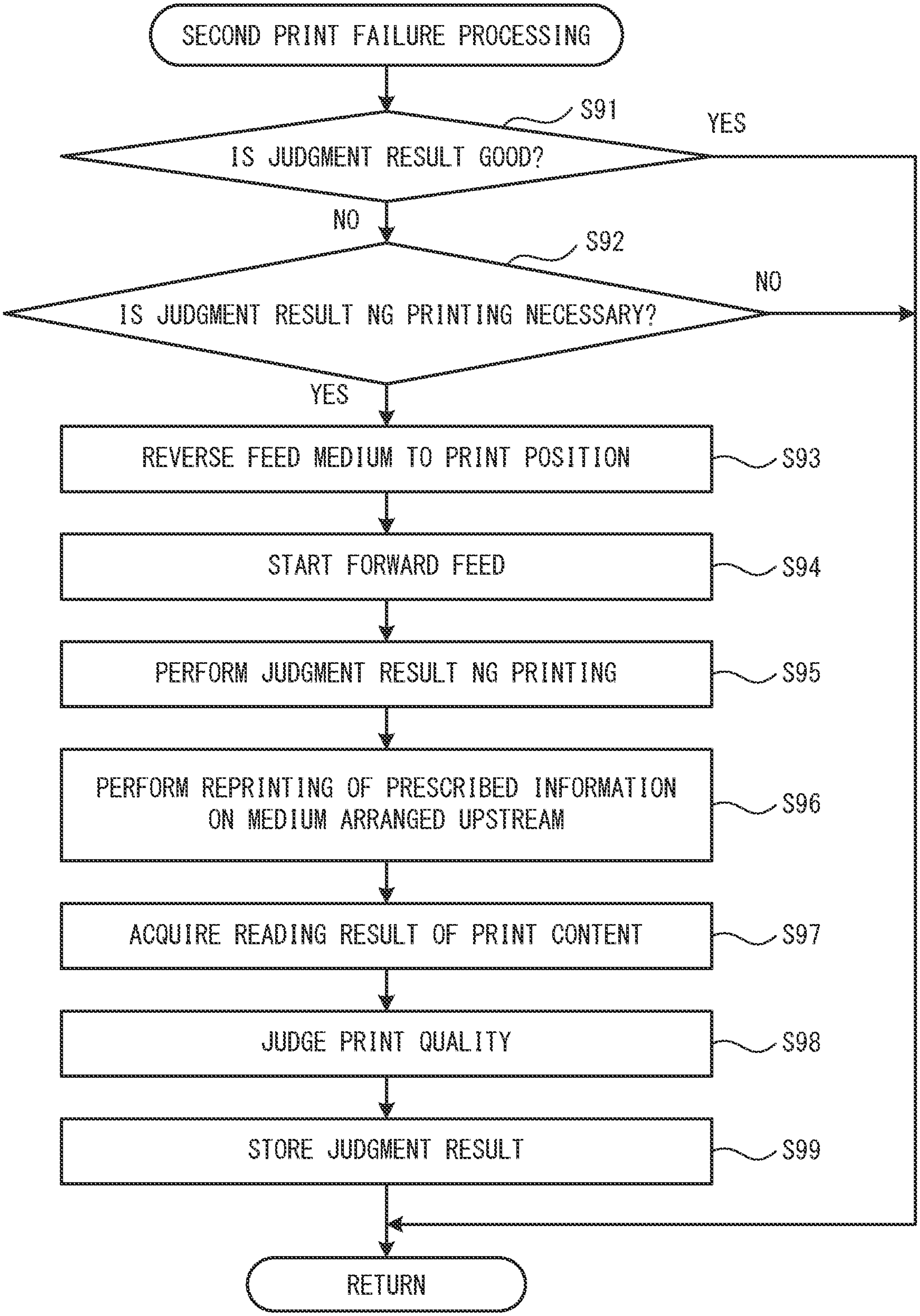
FIG. 10 is a flowchart of second print failure processing.

In the first judgment result information print processing illustrated in FIG. 9, the control portion 30 performs the processing at S62 in advance of the processing at S64, and can thus cause the print medium L arranged downstream, in the forward direction F, of at least one of the first media LX, to be the second medium LY.

When the total print number is a small amount, or the like, the user can relatively easily perform the operation to remove the print medium L of the print failure, without printing the judgment result information on the print media L. The control portion 30 acquires the NG printing necessity information (S50), and performs the first judgment result information print processing or the second judgment result information print processing in accordance with the acquired necessity information. Thus, the print device 1 can perform the operation in accordance with a request of the user.

The control portion 30 prints the prescribed information on the first media LX after the user has verified, in advance, the necessity for printing the judgment result information on the second medium LY, and can thus smoothly perform the operation in accordance with the request of the user.

Depending on the content of the prescribed information to be printed on the first media LX, on an operation content of an operator performing the operation to adhere the print media L to the products, and the like, the zone number appropriate for the operation differs. The print device 1 acquires the zone number and prints the prescribed information on the number of first media LX corresponding to the acquired zone number. Thus, the print device 1 can perform the operation in accordance with the request of the user.

The control portion 30 prints the prescribed information on the first media LX after causing the user to input the zone number in advance, and can thus smoothly perform the operation in accordance with the request of the user.

The control portion 30 performs the judgment result NG printing in which the reference sign P4 is printed on the first medium LX, for which the print quality of the print content of the prescribed information is not good, in the overwritten manner (S95). In this way, the identification, by the user, of the first medium LX for which the print quality of the print content of the prescribed information is not good can be simplified. Thus, the print device 1 can improve the efficiency of the operation of the user.

When the judgment result NG printing has been performed on the first medium LX, the control portion 30 reprints the prescribed information printed on the first medium LX that has been subject to the judgment result NG printing (S96). Thus, the print device 1 can avoid a situation in which the first medium LX is lost as a result of performing the judgment result NG printing.

The control portion 30 acquires the media number of the second media LY (S35), and prints the judgment result information on the number of second media LY according to the acquired media number. In this way, depending on the size of the print media L, the size corresponding to the zone number, and the like, the user can select whether to cause the second medium LY to be the single print medium L, or to be the plurality of print media L. Thus, the print device 1 can present the printing result of the judgment result information to the user in a format desired by the user, and can improve the efficiency of the operation of the user.

The print device 1 is provided with the cutting portion 50 positioned downstream of the reading portion 45 in the forward direction F. The cutting portion 50 cuts the number of first media LX corresponding to the zone number and the second medium LY on which the judgment result information for the number of first media LX corresponding to the zone number is printed, as a set, from the long medium M. Thus, the print device 1 can improve the ability to view, at a glance, the judgment result information and the first media LX corresponding to the judgment result information.

The first conveyance portion 7, the second conveyance portion 10, the third conveyance portion 15, the fourth conveyance portion 19, the fifth conveyance portion 48 are the belt (the endless belt 16), or the roller (the transport rollers 17, 46, and 71, the pinch rollers 18, 47, and 72, the roll R, the drive roller 13 and the driven roller 14). Thus, the long medium M is conveyed in a stable manner on the conveyance path Q. The print portion 6 is the inkjet head, and thus, for example, in comparison to a thermal head or the like, a wide variety of high quality printing can be performed at high speed. The reading portion 45 is configured to include the CIS 451, and thus, the reading portion 45 is downsized compared to being configured using a CCD image sensor, or the like, for example.

The print device 1 acquires the prescribed information from the database 80 in ascending order and performs the ascending order printing of the prescribed information on the print media L in the order of acquisition. When the ascending order printing is performed on the first media LX, the control portion 30 prints the prescribed information on the first media LX such that, in the state in which the long medium M is disposed on the conveyance path Q, the downstream side in the forward direction F is the upper side of the image, characters and the like representing the prescribed information. When the ascending order printing is performed, for the printing of the judgment result information on the second media LY also, the control portion 30 performs the printing such that the downstream side in the forward direction F is the upper side of the characters and the like representing the judgment result information. As a result, the user can easily verify the judgment result information printed on the second media LY and the prescribed information printed on the first media LX in the order in which the long medium M is fed forward.

The print device 1 acquires the prescribed information from the database 80 in descending order and performs the descending order printing of the prescribed information on the print media L in the order of acquisition. When the descending order printing is performed on the first media LX, the control portion 30 prints the prescribed information on the first media LX such that, in the state in which the long medium M is disposed on the conveyance path Q, the downstream side in the forward direction F is the lower side of the image, characters and the like representing the prescribed information. When the descending order printing is performed, for the printing of the judgment result information on the second media LY also, the control portion 30 performs the printing such that the downstream side in the forward direction F is the lower side of the characters and the like representing the judgment result information. The descending order printing is convenient in a case in which, after causing the print device 1 to print all the first media LX of the total print number, the print quality of the first media LX is verified on the basis of the judgment result information printed on the second media LY, and the like. The user easily verifies the judgment result information of the second media LY and the print quality of the first media LX, in order from the first medium LX printed last by the print device 1.

The print device 1 is provided with the winding device connection portion 241 by which the winding device 29 can be electrically connected to the print device 1. When the winding device 29 is connected, the print device 1 prints the prescribed information on the first media LX using the descending order printing. The long medium M on which the first media LX and the second media LY are arranged is sequentially wound onto the core mounted on the shaft portion 29C of the winding device 29. In this case, the prescribed information is arranged in the operation order from the outside toward the inside of the core. After completing the printing on the first media LX of the total print number, while pulling out the long medium M from the core, the user can verify, in ascending order, the judgment result information printed on the second media LY and the print quality of the prescribed information printed on the first media LX.

Note that the present disclosure is not limited to the above-described embodiment, and various modifications can be made to the present disclosure insofar as they do not depart from the scope and gist of the present disclosure. For example, the winding device connection portion 241 may be configured such that the print device 1 and the winding device 29 can be wirelessly connected.

As the print portion 6, in addition to the inkjet head, the print device 1 can employ various print heads, such as a thermal print head, an LED print head, and the like.

In the above-described embodiment, the first conveyance portion 7, the second conveyance portion 10, the fourth conveyance portion 19, and the fifth conveyance portion 48 are configured using the rollers (the transport rollers 17, 46, and 71, the pinch rollers 18, 47, and 72, and the roll R). The third conveyance portion 15 is configured using the rollers (the drive roller 13 and the driven roller 14, the conveyance roller 46, and the pinch roller 47) and the belt (the endless belt 16). The first conveyance portion 7, the second conveyance portion 10, the third conveyance portion 15, the fourth conveyance portion 19, and the fifth conveyance portion 48 may all be configured by rollers, or the first conveyance portion 7, the second conveyance portion 10, the third conveyance portion 15, the fourth conveyance portion 19, and the fifth conveyance portion 48 may all be configured by belts.

In addition to the information indicating the one-dimensional code, such as the barcode or the like, the code information included in the prescribed information may be information indicating a two-dimensional code, such as a QR code or the like. "QR code" is a registered trademark of Denso Wave. The prescribed information may be configured to include only the code information.

In addition to the CIS, the reading portion 45 may be configured to include a barcode reader that captures an image of the code information, reads data of the captured image, and outputs the data to the control portion 30, a two-dimensional scanner, a CCD image sensor, a CMOS image sensor and the like.

FIG. 13D is an example of the long medium M obtained by performing the second judgment result information print processing, and illustrates an example of a case in which the ascending order printing is performed and the second medium LY is arranged upstream of the first media LX in the forward direction F on the long medium M. The first media LX consist of five of the print media L (X=5), and the second media LY consist of one of the print media L (Y=1). Note that FIG. 13D illustrates an example of a case in which the NG printing necessity information stored in the storage portion 31 indicates that the judgment result NG printing is necessary (yes at S52), and the judgment result NG printing and the reprinting of the prescribed information are performed.

The print device 1 can cause the user to select whether to arrange the second medium LY upstream or downstream of the first media LX in the forward direction F, and can thus cause the second medium LY to be arranged upstream or downstream of the first media LX in the forward direction F in accordance with the preference of the user. Further, in the example illustrated in FIG. 13D, the cutting setting is set (yes at S101), and the print device 1 cuts the first media LX and the second medium LY arranged downstream of the first media LX in the forward direction F as a set from the long medium M, at a position indicated by a dotted line. In this case, the print device 1 can allow the user to easily view, at a glance, which of the first media LX are the target of the judgment result information printed on the second media LY. In other words, in the present disclosure, the control portion 30 may convey the long medium M in the forward direction without performing printing on the at least one second media LY, and, after judging of the print quality or the degree of the print quality of the at least one first media LX corresponding to the zone number, convey the long medium M in the reverse direction until the at least one second media LY is at the position of the print portion. The control portion 30 may then print the judgment result information on the at least one second media LY conveyed in the reverse direction to the position of the print portion. The at least one second media LY is arranged upstream of the at least one first media LX in the forward direction, on the long medium M.

FIG. 14G illustrates an example of a printing result on the long medium M when, in the case of performing the descending order printing, the first media LX consist of ten of the print media L (X=10), and the second media LY consist of two of the print media L (Y=2). In FIG. 14G, the second media LY are arranged downstream of the first media LX in the forward direction F on the long medium M. In the example illustrated in FIG. 14G, the judgment results for the print content of the prescribed information of the first media LX are divided into two images, that is, images P71 and P72, and P71 and P72 are formed by two of the second media LY, respectively. Even when the printing of the first media LX and the second media LY is performed in this way, the print device 1 can allow the user to easily understand which of the first media LX are the target of the judgment result information printed on the second media LY.

The first judgment result information print processing and the second judgment result information print processing may be configured such that, after the printing of the prescribed information on the first media LX has been started, the content of the judgment result necessity information relating to the print settings, and the values of X and Y can be changed.

In the above-described embodiment, when the judgment result NG printing is performed (S95), the control portion 30 reprints the prescribed information printed on the first medium LX that has been subject to the execution of the judgment result NG printing (S96). In contrast to this, the control portion 30 may perform the processing at only one of S95 or S96.

Each of the steps of the print processing of the print device 1 is not limited to being executed by the CPU of the control portion 30, and some or all of the steps may be executed by another electronic device (an ASIC, for example). Each of the steps of the print processing may be executed by distributed processing by a plurality of electronic devices (a plurality of CPUs, for example). With respect to each of the steps of the print processing, an order thereof can be changed, or a step can be omitted or added, as necessary. A mode in which an operating system (OS) and the like operating on the print device 1 performs some or all of the print processing on the basis of commands from the control portion 30 is also included in the scope of the present disclosure.

The command to perform the print processing may be issued by the user via the operation portion 4, or may be input automatically when it is detected that the replacement of the roll R is complete. Further, the command to perform the print processing may be input to the control portion 30 via the external device connection portion 242, from the external device, such as the PC or the like. In a similar manner, the judgment result necessity information relating to the print settings, the zone number (the value of X), the medium number of the second media LY (the value of Y), and the total print number (the value of Z) may be input by the user via the operation portion 4. The judgment result necessity information, the zone number (the value of X), the medium number of the second media LY (the value of Y), and the total print number (the value of Z) may be acquired from the external device, such as the PC or the like, via the external device connection portion 242.

The external device connection portion 242 may be configured such that the external information device can be wirelessly connected. A program for executing the print processing may be downloaded via the external device connection portion 242 from a server connected to a network that is not illustrated (in other words, may be transmitted as a transmission signal), and may be stored in the storage portion 31. In this case, it is sufficient that the program for executing the print processing be stored in a non-transitory medium, such as an HDD or the like, provided in the server.

The database 80 may be input to the control portion 30 via the external device connection portion 242 from the external information device, such as the PC or the like storing the database 80. The input database 80 is stored in the storage portion 31, and the printing of the prescribed information on the print media L may be performed by the control portion 30 referring to the database 80 stored in the storage portion 31.

What is claimed is:

1. A print device comprising:

a conveyance portion configured to convey a long medium, on which a plurality of print media is arranged in order, in a forward direction and a reverse direction opposite to the forward direction, in a conveyance direction of the long medium;

a print portion configured to perform printing on each of the plurality of print media conveyed in the forward direction by the conveyance portion;

a reading portion configured to read a print content printed on each of the plurality of print media, the reading portion being disposed downstream of the print portion in the forward direction, in the conveyance direction;

a processor configured to control the conveyance portion, the print portion, and the reading portion; and a memory storing computer-readable instructions that, when executed by the processor, instruct the processor to perform processes comprising:

printing a prescribed information including code information on a prescribed number of a plurality of a first media;

acquiring, using the reading portion, a print content of each of the plurality of the first media on which the printing has been performed;

judging a print quality or a degree of the print quality of each of the plurality of the first media based on a result obtained by the acquiring;

printing judgment result information, indicating a result of the judging the print quality or the degree of the print quality of each of the plurality of the first media, collectively on a second medium arranged adjacent to the prescribed number of the plurality of the first media on the long medium, irrespective of judgement of the print quality or the degree of the print quality of each of the plurality of the first media;

conveying the long medium in the forward direction without performing printing on the second medium; and after the judging of the print quality or the degree of the print quality of the plurality of the first media, conveying the second medium in the reverse direction to a position of the print portion, the printing of the judgment result information is performed on the second medium conveyed in the reverse direction to the position of the print portion, and on the long medium, the second medium is arranged downstream of the plurality of the first media in the forward direction.

2. The print device according to claim 1, wherein the judgment result information includes identification information that is information to identify each of the plurality of the first media, and a character or symbol indicating the result of the judging the print quality or the degree of the print quality, for each of the plurality of the first media associated with the identification information.

3. The print device according to claim 1, wherein the computer-readable instructions further instruct the processor to perform processes comprising:

conveying the long medium in the forward direction without printing on the second medium, before the printing of the prescribed information.

4. The print device according to claim 1, further comprising:

a necessity information acquisition portion configured to acquire necessity information indicating a necessity for printing the judgment result information, wherein the computer-readable instructions further instruct the processor to perform processes comprising:

printing the prescribed information in accordance with the necessity information acquired via the necessity information acquisition portion.

5. The print device according to claim 4, wherein the computer-readable instructions further instruct the processor to perform processes comprising:

acquiring the necessity information via the necessity information acquisition portion before the printing of the prescribed information.

6. The print device according to claim 1, further comprising:

a zone number acquisition portion configured to acquire a zone number, the zone number being the prescribed number of the plurality of the first media, wherein the computer-readable instructions further instruct the processor to perform processes comprising:

acquiring the zone number via the zone number acquisition portion, and the printing of the prescribed information is performed in accordance with the acquired zone number.

7. The print device according to claim 6, wherein the computer-readable instructions further instruct the processor to perform processes comprising:

acquiring the zone number via the zone number acquisition portion before the printing of the prescribed information.

8. The print device according to claim 1, wherein the computer-readable instructions further instruct the processor to perform processes comprising:

when it is judged, by the judging of the print quality or the degree of the print quality, that the print content of the plurality of the first media is not good, performing a judgment result printing on the plurality of the first media, the judgment result printing being printing of content indicating that the print content is not good.

9. The print device according to claim 8, wherein the computer-readable instructions further instruct the processor to perform processes comprising:

when the judgment result printing has been performed, printing the prescribed information corresponding to the plurality of the first media subject to the printing of the judgment result printing, on at least one of the plurality of print media arranged upstream, in the forward direction, of the plurality of the first media, on the long medium.

10. The print device according to claim 1, further comprising:

a medium number acquisition portion configured to acquire a medium number indicating whether to cause the second medium to be a single medium or a plurality of media, wherein the computer-readable instructions further instruct the processor to perform processes comprising:

in the printing of the judgment result information, when there is an input indicating that the second medium is to be the single medium, printing the judgment result information on the single medium, of the second medium; and when there is an input indicating that the second medium is to be the plurality of media, printing the judgment result information in a divided manner on the plurality of media, of the second medium.

11. The print device according to claim 1, further comprising:

a cutting portion configured to cut at least one of the plurality of print media from the long medium, the cutting portion being disposed downstream of the reading portion in the forward direction, wherein the computer-readable instructions further instruct the processor to perform processes comprising:

controlling the cutting portion to cut the long medium for the plurality of the first media and the second medium on which the judgment result information is printed for the plurality of the first media to be cut as a set.

12. The print device according to claim 1, wherein the conveyance portion is a belt or a roller, the print portion is an inkjet head, and the reading portion is a CIS.

13. The print device according to claim 1, wherein the computer-readable instructions further instruct the processor to perform processes comprising:

in the printing of the prescribed information, acquiring the prescribed information in an ascending order, from a database in which the prescribed information corresponding to the total print number is arranged in an operation order relating to the plurality of print media, and sequentially printing the prescribed information on the plurality of print media with the downstream side, in the forward direction, of the long medium being an upper portion of the prescribed information, and in the printing of the judgment result information, printing the judgment result information on the second medium with the downstream side, in the forward direction, of the long medium being an upper portion of the judgment result information.

14. The print device according to claim 1, wherein the computer-readable instructions further instruct the processor to perform processes comprising:

in the printing of the prescribed information, acquiring the prescribed information in a descending order, from a database in which the prescribed information of the total print number is arranged in an operation order relating to the plurality of print media, and sequentially printing the prescribed information on the plurality of print media with the downstream side, in the forward direction, of the long medium being a lower portion of the prescribed information, and in the printing of the judgment result information, printing the judgment result information on the second medium with the downstream side, in the forward direction, of the long medium being a lower portion of the judgment result information.

15. The print device according to claim 14, further comprising:

a connection portion configured to electrically connect a winding device configured to sequentially wind the long medium in the forward direction, the connection portion being disposed downstream of the reading portion in the forward direction.

16. A print method for performing printing on a long medium on which a plurality of print media is arranged in order, the print method comprising:

printing a prescribed information including code information on a prescribed number of a plurality of a first media;

acquiring a print content of each of the plurality of the first media on which the printing has been performed;

judging a print quality or a degree of the print quality of each of the plurality of the first media, based on a result obtained by the acquiring;

printing judgment result information, indicating a result of the judging the print quality or the degree of the print quality of each of the plurality of the first media, collectively on a second medium arranged adjacent to the prescribed number of the plurality of the first media on the long medium, irrespective of judgement of the print quality or the degree of the print quality of each of the plurality of the first media;

conveying the long medium in the forward direction without performing printing on the second medium, using a conveyance portion configured to convey the long medium in a forward direction and a reverse direction opposite to the forward direction, in a conveyance direction of the long medium; and after the judging of the print quality or the degree of the print quality of the plurality of the first media, conveying the second medium in the reverse direction to a position of the print portion, using the conveyance portion, wherein the printing of the judgment result information is performed on the second medium conveyed in the reverse direction to the position of the print portion, and on the long medium, the second medium is arranged downstream of the plurality of the first media in the forward direction.

17. The print method according to claim 16, wherein the judgment result information includes identification information that is information to identify each of the plurality of the first media, and a character or symbol indicating the result of the judging the print quality or the degree of the print quality, for each of the plurality of the first media associated with the identification information.

18. A non-transitory computer-readable medium storing a print program including computer-readable instructions for performing printing on a long medium on which a plurality of print media is arranged in order, the computer-readable instructions, when executed by a processor provided in a print device, instructing the processor to perform processes comprising:

printing a prescribed information including code information on a prescribed number of a plurality of a first media;

acquiring a print content of each of the plurality of the first media on which the printing has been performed;

judging a print quality or a degree of the print quality of the plurality of the first media based on a result obtained by the acquiring; and printing judgment result information, indicating a result of the judging the print quality or the degree of the print quality of each of the plurality of the first media, collectively on a second medium arranged adjacent to the prescribed number of the plurality of the first media on the long medium, irrespective of judgement of the print quality or the degree of the print quality of each of the plurality of the first media conveying the long medium in the forward direction without performing printing on the second medium, using a conveyance portion configured to convey the long medium in a forward direction and a reverse direction opposite to the forward direction, in a conveyance direction of the long medium; and after the judging of the print quality or the degree of the print quality of the plurality of the first media, conveying the second medium in the reverse direction to a position of the print portion, using the conveyance portion, the printing of the judgment result information is performed on the second medium conveyed in the reverse direction to the position of the print portion, and on the long medium, the second medium is arranged downstream of the plurality of the first media in the forward direction.

19. The non-transitory computer-readable medium according to claim 18, wherein the judgment result information includes identification information that is information to identify each of the plurality of the first media, and a character or symbol indicating the result of the judging the print quality or the degree of the print quality, for each of the plurality of the first media associated with the identification information.

* * * * *